US012623400B2

(12) United States Patent
Dorini et al.

(10) Patent No.: US 12,623,400 B2
(45) Date of Patent: May 12, 2026

(54) COUNTERFLOW GAS FLOW DELIVERY STRUCTURE FOR APPARATUS FOR THE LAYER-BY-LAYER FORMATION OF THREE-DIMENSIONAL OBJECTS

(71) Applicant: Stratasys Powder Production Ltd., London (GB)

(72) Inventors: Gianluca Dorini, London (GB); Anders Hartmann, London (GB); Marcel Garrido Barrabes, London (GB)

(73) Assignee: Stratasys Powder Production Ltd., Nottingham (GB)

( * ) Notice: Subject to any disclaimer, the term of this patent is extended or adjusted under 35 U.S.C. 154(b) by 914 days.

(21) Appl. No.: 17/789,755

(22) PCT Filed: Dec. 23, 2020

(86) PCT No.: PCT/GB2020/053359
§ 371 (c)(1),
(2) Date: Jun. 28, 2022

(87) PCT Pub. No.: WO2021/136930
PCT Pub. Date: Jul. 8, 2021

(65) Prior Publication Data
US 2023/0036660 A1    Feb. 2, 2023

(30) Foreign Application Priority Data

Dec. 30, 2019    (GB) ...................................... 1919422

(51) Int. Cl.
B29C 64/364    (2017.01)
B22F 12/70    (2021.01)
(Continued)

(52) U.S. Cl.
CPC ............ B29C 64/153 (2017.08); B22F 12/70 (2021.01); B29C 64/25 (2017.08); B29C 64/268 (2017.08);
(Continued)

(58) Field of Classification Search
CPC ..... B29C 64/364; B29C 64/371; B22F 12/70; B05D 3/06; B05B 12/18
See application file for complete search history.

(56) References Cited

U.S. PATENT DOCUMENTS 10,661,341 B2 *    5/2020    Romano ............... B29C 64/371
11,504,909 B2 *    11/2022    Shimoda ................. B22F 3/105
(Continued)

FOREIGN PATENT DOCUMENTS

JP          2017177557 A      10/2017
KR      1020180003295 A      1/2018
WO        2019/124115 A1      6/2019

*Primary Examiner* — Xiao S Zhao
*Assistant Examiner* — Nicholas J Chidiac
(74) *Attorney, Agent, or Firm* — Honigman LLP; Eric J. Sosenko; Jonathan P. O'Brien

(57) ABSTRACT

A structure for delivering a flow of gas across a window or aperture of an imaging or measurement device within an apparatus for the manufacture of three-dimensional objects by layer-by-layer consolidation of particulate matter, the structure comprising: a hollow body having an upper aperture for mounting in correspondence with the window/ aperture of said device, a gas flow intake region below the upper aperture, and a lower aperture; wherein the gas flow intake region is provided on opposing sides of the hollow body when viewed in cross-section along a longitudinal axis that runs from the upper aperture to the lower aperture, and comprises one or more channels configured to allow, in use, a flow of intake gas to enter the hollow body from the opposing sides of the hollow body with a flow component that predominantly lies in a plane parallel to the plane of the
(Continued)

upper aperture, and to come into confluence within the hollow body; and wherein the hollow body is symmetrically shaped about the longitudinal axis so as to redirect the confluent flow of intake gas to form a substantially axial flow of gas along the longitudinal axis, and a backflow of gas near the internal wall of the hollow body, wherein the upper aperture is substantially shielded from the backflow by the intake flow, and wherein the velocity of the backflow is relatively low in comparison to the velocity of the intake flow. Also provided is an apparatus for the manufacture of three-dimensional objects by layer-by-layer consolidation of particulate matter, incorporating such a structure, and a method of delivering a flow of gas using such a structure.

7 Claims, 13 Drawing Sheets

(51) Int. Cl.

| | |
|---|---|
| *B29C 64/153* | (2017.01) |
| *B29C 64/25* | (2017.01) |
| *B29C 64/268* | (2017.01) |
| *B33Y 30/00* | (2015.01) |
| *B22F 10/28* | (2021.01) |
| *B33Y 40/00* | (2020.01) |

(52) U.S. Cl.
CPC ............ *B29C 64/364* (2017.08); *B22F 10/28* (2021.01); *B22F 2999/00* (2013.01); *B33Y 30/00* (2014.12); *B33Y 40/00* (2014.12)

(56) References Cited

U.S. PATENT DOCUMENTS

| | | | |
|---|---|---|---|
| 2017/0355136 A1 | 12/2017 | Matusmoto | |
| 2018/0065303 A1 | 3/2018 | Schade | |
| 2018/0126649 A1* | 5/2018 | Romano | ................. B29C 64/35 |
| 2021/0023788 A1* | 1/2021 | Shimoda | .................. B22F 3/16 |

* cited by examiner

COUNTERFLOW GAS FLOW DELIVERY STRUCTURE FOR APPARATUS FOR THE LAYER-BY-LAYER FORMATION OF THREE-DIMENSIONAL OBJECTS

CROSS REFERENCE TO RELATED APPLICATIONS

This application is a National Stage Entry of International Application No. PCT/GB2020/053359, filed Dec. 23, 2020, which is based on and claims the benefit of foreign priority under 35 U.S.C. § 119 to GB Application No. 1919422.4, filed Dec. 30, 2019. This entire contents of the above-referenced applications are expressly incorporated herein by reference.

The present disclosure relates to a structure for delivering a flow of gas across a window or aperture of an imaging or measurement device within an apparatus for the manufacture of three-dimensional (3D) objects by layer-by-layer consolidation of particulate matter, and to apparatus for the layer-by-layer formation of 3D objects comprising such a structure. The structure may be particularly suitable for use in powder bed applications that require infrared radiation.

BACKGROUND

Applications such as laser sintering, or so-called "print and sinter" techniques such as high speed sintering, for forming three-dimensional objects from particulate material are receiving increased interest as they are moving towards faster throughput times and become industrially viable. In these 3D manufacturing processes, the object is formed layer-by-layer from particulate material that is spread in successive layers across a build surface. Each layer of particulate matter is fused, or sintered, over defined regions to form a cross section of the three-dimensional object.

These applications use infrared lamps to preheat the layer and/or to sinter the defined regions. For example, print and sinter applications use a high power infrared lamp to sinter areas of particulate material, such as polymer powder, that have been printed with radiation absorptive material (RAM). The 3D manufacturing process creates a hot dusty environment within the apparatus, that can compromise the ability to reliably measure properties of the process, such as build bed surface temperature, by depositing contaminants such as dust and fumes on sensitive components of measurement or imaging devices that are exposed to said environment within the apparatus.

SUMMARY

Aspects of the invention are set out in the appended independent claims, while particular embodiments of the invention are set out in the appended dependent claims.

The following disclosure describes, in a first aspect, a structure for delivering a flow of gas across a window or aperture of an imaging or measurement device within an apparatus for the manufacture of three-dimensional objects by layer-by-layer consolidation of particulate matter, the structure comprising: a hollow body having an upper aperture for mounting in correspondence with the window/aperture of said device, a gas flow intake region below the upper aperture, and a lower aperture; wherein the gas flow intake region is provided on opposing sides of the hollow body when viewed in cross-section along a longitudinal axis that runs from the upper aperture to the lower aperture, and comprises one or more channels configured to allow, in use, a flow of intake gas to enter the hollow body from the opposing sides of the hollow body with a flow component that is predominantly parallel to the plane of the upper aperture, and to come into confluence within the hollow body; and wherein the hollow body is symmetrically shaped about the longitudinal axis so as to redirect the confluent flow of intake gas to form a substantially axial flow of gas along the longitudinal axis, and a backflow of gas near the internal wall of the hollow body, wherein the upper aperture is substantially shielded from the backflow by the intake flow, and wherein the velocity of the backflow is relatively low in comparison to the velocity of the intake flow.

According to a second aspect of the disclosure there is provided an apparatus for the manufacture of three-dimensional objects by layer-by-layer consolidation of particulate matter, the apparatus including: a build bed in which said objects are formed in use; an imaging or measurement device directed towards the surface of the build bed, said device having a window or aperture; and a structure in accordance with the first aspect, mounted in correspondence with the window/aperture of said device, for delivering a flow of gas across the window/aperture of said device.

According to a third aspect of the disclosure there is provided a method of delivering a flow of gas across the window/aperture of the imaging or measurement device of the apparatus of the second aspect, the method comprising: supplying a flow of intake gas through the gas flow intake region of said structure, from opposing sides of the hollow body, and thence into the hollow body of said structure, the flow of intake gas having a flow component that is predominantly parallel to the plane of the upper aperture of said structure, and coming into confluence within the hollow body; and redirecting the confluent flow of intake gas to form a predominantly axial flow of gas along the longitudinal axis of the hollow body, and a backflow of gas near the internal wall of the hollow body, wherein the upper aperture is substantially shielded from the backflow by the intake flow, and wherein the velocity of the backflow is relatively low in comparison to the velocity of the intake flow.

BRIEF DESCRIPTION OF THE DRAWINGS

Reference is now directed to the drawings, in which.

In the Figures, like elements are indicated by like reference numerals throughout.

DETAILED DESCRIPTION

Figure 1:
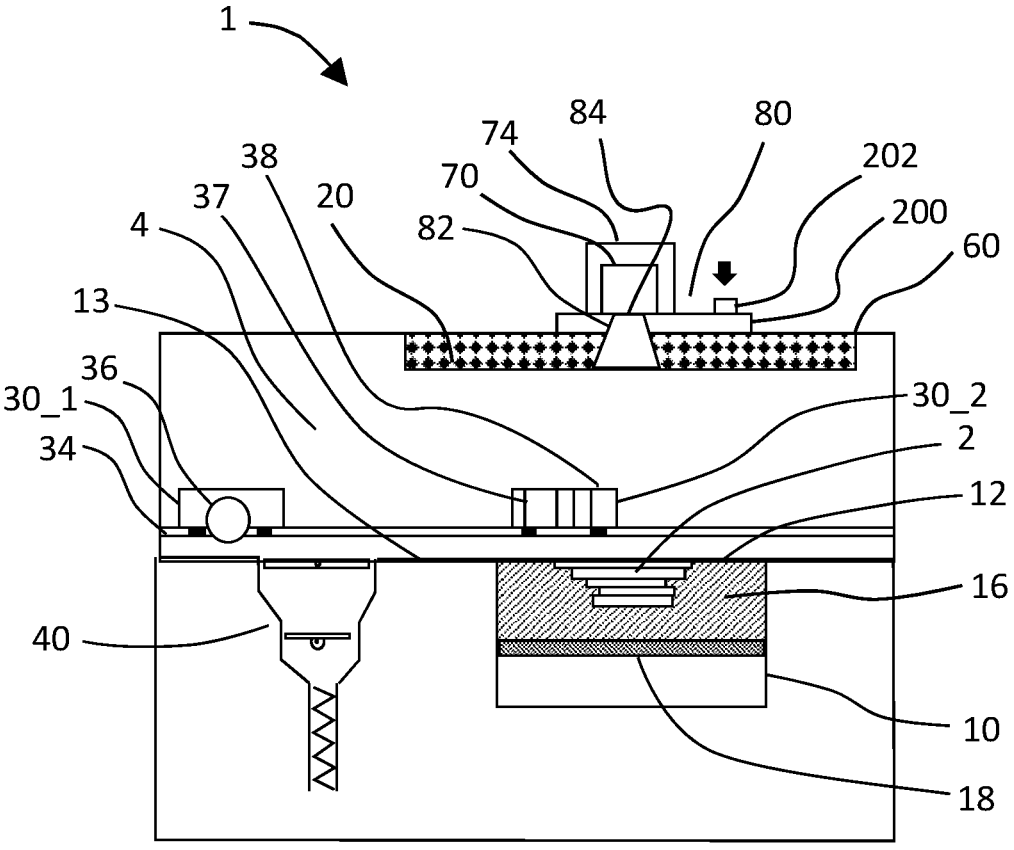
FIG. 1 is a schematic cross-sectional view of an apparatus for the layer-by-layer formation of three-dimensional objects comprising a gas flow delivery structure according to an embodiment of the present invention, for delivering a flow of gas across a window or aperture of an imaging or measurement device.

FIG. 1 shows an apparatus 1 for the layer-by-layer formation of three-dimensional objects by the aggregation of particulate matter by high speed sintering. In accordance with embodiments of the present invention, the apparatus 1 has a gas flow delivery structure 80, for delivering a flow of gas across a window or aperture of an imaging or measurement device within the apparatus 1. The gas flow delivery structure 80 comprises a hollow body 82 having an upper aperture 84, into which gas may enter from a gas flow intake region 86 (not shown in FIG. 1) near the upper aperture 84. The gas is provided to the gas flow intake region 86 from a supply chamber 200 surrounding the gas flow intake region 86 and having an inlet 202 supplied by an external gas supply, as indicated by the downward-pointing arrow. Further details of the gas flow delivery structure 80 will be described below with reference to FIGS. 2A to 8C and FIGS. 10A to 11B.

The terms "gas", "gas flow" and the like, as used herein, should be interpreted broadly, to encompass atmospheric air, as well as a specifically-provided gas or mixture of gases (e.g. from a dedicated gas supply).

More generally, the illustrated apparatus 1 has a working space 4 bounded from below by a working surface 13 and from above by a ceiling 60. The working surface 13 comprises a build bed surface 12, which is the surface over which successive layers of particulate material, such as powder, are distributed and processed to form cross-sections of an object 2. Above the build bed surface 12, mounted centrally within the area of the overhead heater arrangement 20, a camera 70 is provided within a housing 74 mounted to the upper aperture 84 of the gas flow delivery structure 80.

In the illustrative apparatus 1 shown, the imaging or measurement device 70 may be a thermal camera for monitoring the temperature of the build bed surface 12, although in alternative implementations different imaging or measurement devices may be provided.

One or more carriages 30 (in this case two) are arranged to be movable across a working surface 13 comprising the build bed surface 12. The apparatus 1 further comprises a powder container system 10 which comprises a build bed 16 supporting the formed 3D object 2 and having the build bed surface 12 from which the object 2 is formed, layer by layer. A powder dosing module 40 is arranged to dose fresh powder to the working surface 13. The first and second carriages 30_1, 30_2 respectively support a distribution device 36, and a printing module 38 comprising one or more droplet deposition heads and a lamp module 37. The carriages are movable on at least one rail 34 back and forth across the build bed surface 12.

In an illustrative process sequence, the floor 18 of the powder container system 10, which bounds the bottom surface of the build bed 16, lowers the build bed 16 by a layer thickness. With the first carriage 30_1 supporting the distribution device 36 located to the far side of the dosing module 40 with respect to the build bed surface 12, and the second carriage 30_2 located on the opposite side of the build bed surface 12 with respect to the first carriage 30_1, the dosing module 40 doses an amount of powder to the work surface 13, adjacent the build bed surface 12. The first carriage is moved across the build bed surface 12 so that the distribution device 38 distributes the dosed powder so as to form a thin layer across the build bed surface 12. Next, the first carriage 30_1 moves back to its starting position, followed by the second carriage 30_2. Starting from the dosing module side, the second carriage 30_2 moves across the build bed surface 12 to the opposite side and the one or more droplet deposition heads of the printing module 38 deposit fluid containing RAM over selected areas of the build bed surface 12 corresponding to the cross section of the object 2 to be formed, and the infrared lamp 110 is operated to sinter the printed powder. The process then may start again to proceed layer by layer until the object 2 is fully built.

During the process of building the object 2, the infrared camera 70 may be used to monitor, whether continuously or intermittently, the temperature of the build bed surface 12 by detecting infrared radiation emitted from the build bed surface 12. The camera 70 must therefore be located so that its field of view encompasses the build bed surface 12. Conveniently, it may be located centrally above the build bed surface 12 at or near the ceiling 60 of the working space 4. Since the build process generates an environment filled with hot ink fumes and powder particles, it is desirable to protect the optics of the camera 70 from the accumulation of dust, in order to provide reliable measurements throughout the build process.

To this end, the present gas flow delivery structure 80 has been developed, that can deliver a specifically shaped flow of gas across the sensitive area (such as the camera optics) of the imaging or measurement device 70, to substantially, or entirely, isolate the sensitive area from the work space environment and improve the provision of reliable measurements.

Figure 2A:
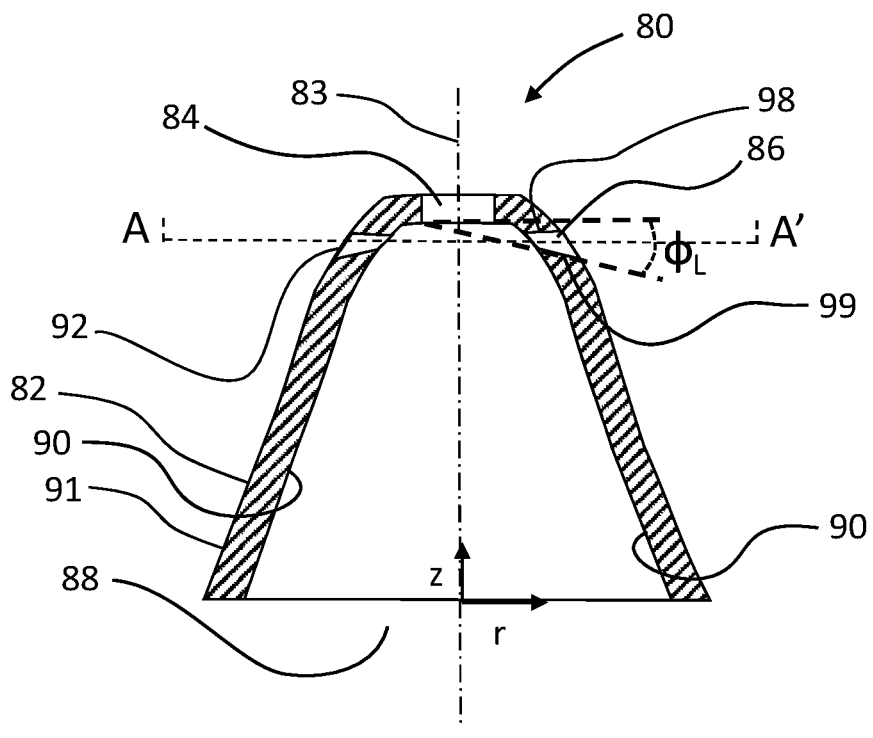
FIG. 2A is a schematic cross-section along the longitudinal axis of a gas flow delivery structure according to an embodiment, comprising a hollow body.
Figure 3A:
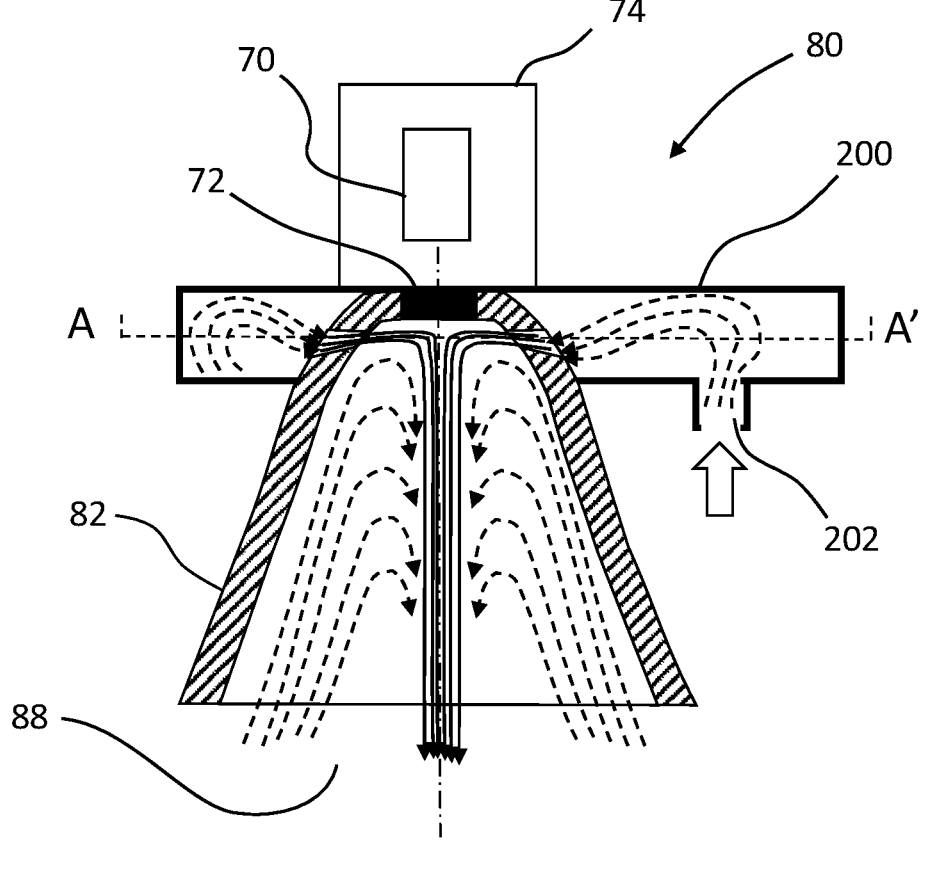
FIG. 3A is a schematic cross-section along the longitudinal axis of the gas flow delivery structure of FIG. 2A, also including a gas supply chamber.

Accordingly, and with reference in passing to FIGS. 2A and 3A, a gas flow delivery structure 80 is provided for delivering a flow of gas across a window or aperture of an imaging or measurement device 70, within an apparatus 1 for the manufacture of 3D objects 2 by layer-by-layer consolidation of particulate matter. The gas flow delivery structure 80 comprises a hollow body 82 having an upper aperture 84 for mounting in correspondence with the window/aperture of the device 70, a gas flow intake region 86 below the upper aperture, and a lower aperture 88. The gas flow intake region 86 is provided on opposing sides of the hollow body 82, when viewed in cross-section along a longitudinal axis 83 of the hollow body, that extends from the upper aperture 84 to the lower aperture 88. The gas intake region 86 comprises one or more channels 92 configured to allow, in use, a flow of intake gas 100 to enter the hollow body 82 from the opposing sides of the hollow body 82, with a flow component 102 that is substantially parallel to the plane of the upper aperture, and to come into confluence within the hollow body 82. Furthermore, the hollow body 82 is symmetrically shaped about the longitudinal axis 83 so as to redirect the confluent flow of intake gas 100 to form a substantially axial flow 104 of gas along the longitudinal axis 83, and a backflow 104 of gas near the internal wall 90 of the hollow body. The intake flow is provided such that the velocity of the backflow 104 is relatively low in comparison to the velocity of the intake flow 100, the upper aperture 84 is substantially shielded from the backflow 102 by the confluent flow of intake gas 100. By "confluence" or "confluent" it is meant that the intake flow has a plurality of intake flow components that flow towards one another from different locations of the intake region. In other words, the intake flow components leave the intake region and have velocity components that are directed radially inwards with respect to the longitudinal axis, such that, as the radial velocity components converge towards the longitudinal axis, they are eventually redirected to form the downwardly directed axial flow 104 of gas. By "opposing sides" it is meant that the different intake flow components originate from different locations of the intake region. The initial entry direction of the flow components may form an acute angle to a radial line to the longitudinal axis that lies in a plane parallel to the plane of the aperture. The acute angle may be 45 degrees or less, i.e. the flow may be directed just off to one side of the longitudinal axis, or have a predominantly radial component. In this way, a circulatory flow is created near the aperture that merges and becomes the confluent downward flow along the longitudinal axis.

Embodiments of the structure 80 and its functionality will now be described in more detail with respect to FIGS. 2A to 8C and FIGS. 10A to 11B.

In FIG. 2A, an embodiment of the structure 80 is shown in schematic cross section along the longitudinal axis 83 of a hollow body 82 comprised in the structure 80. The hollow body 82 has an upper aperture 84 and a lower aperture 88. The upper aperture 84 is for mounting a measurement or imaging device (as will be explained in FIGS. 3A to 3C) in correspondence with the upper aperture 84.

Figure 2B:
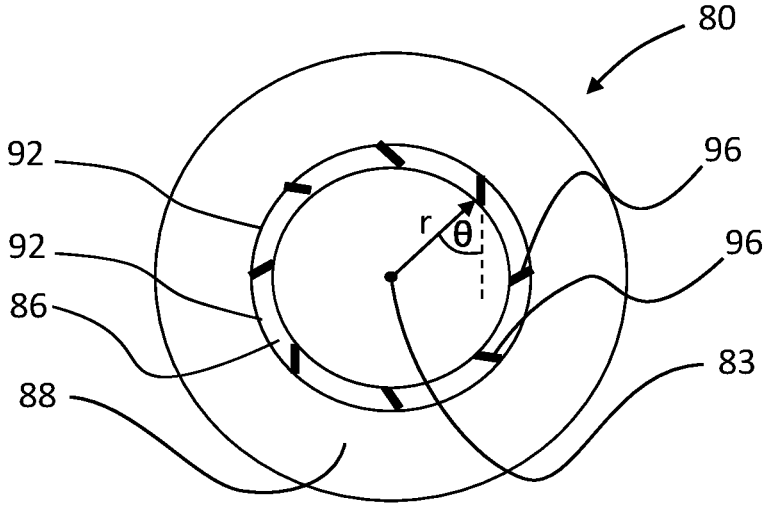
FIG. 2B is a plan view of a cut along section A-A' of the gas flow delivery structure of FIG. 2A.

Below the upper aperture 84, the hollow body 82 has channels 92 that provide an opening through the hollow body 82, from the outer wall 91 to the internal wall 90 of the hollow body 82, so that gas may pass from an exterior of the hollow body 82 to the interior of the hollow body 82. The hollow body 82 is symmetrically shaped about the longitudinal axis 83, and in the embodiment shown is bell-shaped, having an outwardly flaring hollow body 82 so that the lower aperture 88 is larger than the upper aperture 84. FIG. 2B is a schematic plan view of the structure 80 along a section A-A' indicated in FIG. 2A, showing that the upper aperture 84 and the lower aperture 88 have circular cross sections. The hollow body 82 is symmetrically shaped about the longitudinal axis 83.

Thus, furthermore, the hollow body 82 may be described by a series of circular cross sections that gradually vary in diameter from the upper aperture 84 to the lower aperture 88 to form an outwardly flaring body; in other words, the hollow body 82 may flare outwards from the upper aperture 84 towards the lower aperture 88. For example, the hollow body 82 may be cone shaped or bell shaped, as these shapes may promote the setting-up of advantageous gas flow patterns within the hollow body 82 in order to protect the upper aperture 84 from fumes and dust.

The gas intake regions 86 provided by the channels 92 are illustratively represented in FIG. 2B, which illustrates sections of a circumferential slot at a section A-A' (indicated in FIG. 2A) through the hollow body 82. A plurality of vanes 96 divide the slot into sections, or channels 92, each channel 92 representing a sub region contributing to the overall gas flow intake region 86. Other suitable arrangements of the gas flow intake region 86 may be envisaged, some of which will be presented and described with reference to FIGS. 4A to 5B.

The upper aperture 84 is sized according to the corresponding aperture or window of the measurement or imaging device 70 to be mounted to it, and thus may not constitute the entire area of the upper ceiling of the hollow body. Instead, a transverse portion in the general form of a ring having a surface perpendicular to the longitudinal axis 83 may comprise the upper aperture 84, as is shown by example in FIG. 2A.

The gas intake region 86 is provided near the upper aperture 84. The purpose of the gas intake region 86 and the arrangement of the hollow body 82 will now be explained with reference to FIG. 2C, which shows gas flow lines set up in the hollow body when gas is provided via the channels 92 into the hollow body.

Figure 2C:
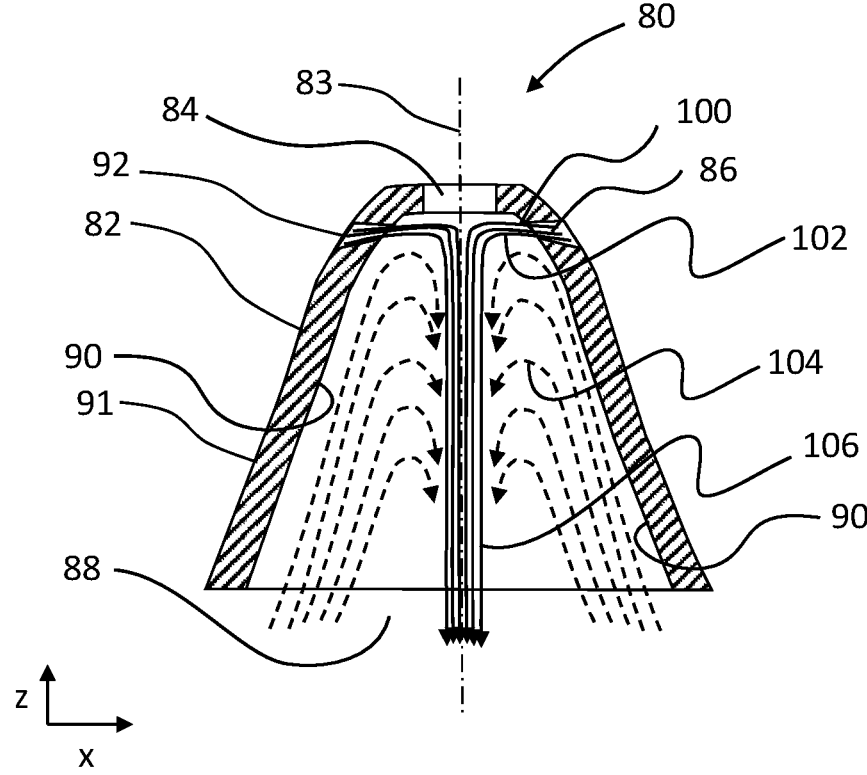
FIG. 2C is the same as FIG. 2A and showing gas flow lines when the gas flow delivery structure is in use.

FIG. 2C thus illustrates three flow regimes, as indicated by the flow lines. A first flow regime may be generated, in use, immediately after the intake flow 100 enters the hollow body 82 near the upper aperture 84, having a flow component 102 that is predominantly parallel to the ceiling of the upper aperture 84. The second flow regime is a downward axial flow 106 of gas along the longitudinal axis 83, due to confluence of the flow components 102, and the third flow regime is a backflow 104 of gas near the internal wall 90 of the hollow body.

If the upper aperture 84 comprises a disc shaped window, for example a germanium window for transmitting infrared radiation to an infrared camera, the intake flow experiences an obstruction at the upper aperture 84 that helps redirect the confluent flow. In this case, the flow components 102 may be predominantly parallel to the surface of the germanium window. By "substantially parallel" or "predominantly parallel" it is meant that the flow has a majority component (>50% of the intake flow) that travels parallel to the surface of the window. It is not necessary that all of the intake flow 100 travels as a substantially parallel confluent flow component, as will be seen in the following implementations.

Figure 6:
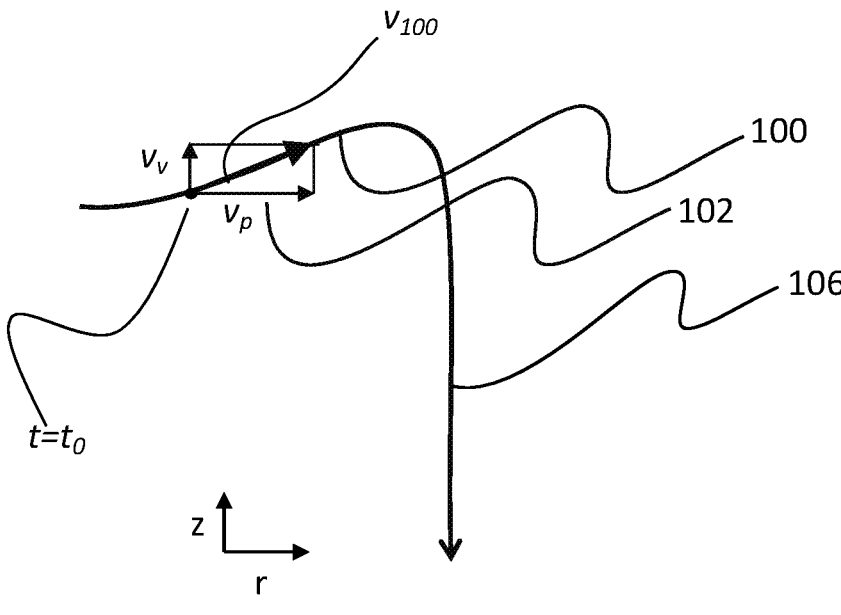
FIG. 6 is a schematic illustration of flow components according to the gas flow delivery structures of FIGS. 2A to 4B.

The flow may be described in terms of velocity components. This is illustrated in FIG. 6, showing one flow path after entry into the hollow body 82 as an intake flow 100 having a velocity $v_{100}(t_0)$ at a time $t=t_0$, where at any given point in time t the velocity of the intake flow, $v_{100}(t)$, comprises velocity components $v_p(t)$, $v_v(t)$ which are respectively parallel to the plane of the upper aperture and parallel to the longitudinal axis 83 (where $v_p$ is a resultant of the tangential and radial flow components). Note that the angle between $v_{100}$ and $v_p$ is the angle $\Phi$ that defines the axial component of the intake flow at $t=t_0$. In the example of FIG. 6, the intake flow is directed upwards, for example by an upward angle in the lower edge of a circumferential slot, towards the upper aperture 84 before being redirected by for example the presence of a window to form a substantially downward axial flow of gas, axial flow component 106, along the longitudinal axis 83 within the hollow body. It can be seen from the velocity vectors in FIG. 6 that, at $t=t_0$, the parallel velocity component is larger than the vertical component, $v_p(t_0) > v_v(t_0)$, and thus, the flow component 102 is substantially parallel to the plane of the upper aperture 84 at this point in time.

As can be seen from the flow lines illustrated in FIG. 2C, the intake flow 100 exits the gas intake region 86 and moves radially inwards so as to come into confluence within the hollow body 82, at or near the longitudinal axis 83, e.g. the parallel and confluent flow components generated by the intake flow 100 from the intake regions 86 converge in proximity to the plane of the upper aperture/window surface at or near the longitudinal axis 83; in other words a parallel confluent flow component 102 is generated by each channel 92 near the upper aperture 84. Following confluence, these flow components are redirected to form a substantially axial, downward flow of gas 106. By "substantially axial" it is meant that a dominant portion of the confluent flow components are redirected along the longitudinal axis for an appreciable distance (i.e. to be recognised as such). Meanwhile, the hollow body is shaped such that a backflow of gas 104 is generated by the substantially axial, downward flow of gas 106. The backflow of gas 104 proceeds upwards into the hollow body 82 near and/or along the internal wall 90; this then forms a region of backflow gas 104 bounded by the internal wall 90, the flow of intake gas 100 and the axial flow 104. The velocities of the flows are provided such that the velocity of the backflow is relatively low in comparison to the velocity of the intake flow, and as a result the velocity of the confluent flow of intake gas 100 and the substantially axial flow 104 of gas along the longitudinal axis are relatively high in comparison to the velocity of the backflow. This results in the upper aperture 84 being substantially shielded from the slower backflow 104 by the relatively faster confluent flow of intake gas 100, and thus protectively shielded from particulate material that has been entrained in the backflow 104, thereby reducing or eliminating the amount of particulate material that reaches the upper opening 84.

The redirection of the parallel confluent flow components 102 of the intake flow 100 may be achieved or improved further by one or more features of the hollow body 82: the angle at which the intake flow enters the hollow body; the optional provision of a window posing an obstruction to any upward flow component; a suitable rate of flow of intake gas, etc.

The rate of flow of intake gas may be improved by arranging the channels such that the flow rate increases as the gas passes through them. For example, the cross-sectional area of the one or more channels of the gas flow intake region may reduce (for example by reducing their diameter, or their height and/or width) from the outside of the hollow body towards the inside of the hollow body. To provide sufficient flow into the hollow body 82, the aggregate cross-sectional area of the inlet into the hollow body 82 may be made as large as possible. For example, the gas flow intake region may be arranged along a circumference of the hollow body 82.

Channels in the Form of Slots

Preferable, the one or more channels of the gas flow intake region may comprise one or more slots. Optionally, the one or more slots may extend substantially perpendicular to the longitudinal axis of the hollow body. The slots may represent an almost continuous circumferential area through the hollow body; for example, they may be arranged as a single ring-shaped slot, whereby the upper part of the hollow body is connected to the lower part of the hollow body by external brackets. Alternatively, the ring-shaped slot may connect the upper part of the hollow body to the lower part of the hollow body by a series of narrow struts extending between the lower edge 99 of the slot to the upper edge 98 of the slot.

Additionally, or instead, therefore, the one or more slots may extend over a majority, or continuously, over all of a circumferential line around the axis of the hollow body. This helps to generate a continuous curtain of confluent flow over the cross-sectional area of the hollow body 82 in and adjacent to the plane of the gas intake region 86. The continuous curtain, which is redirected into an axial downward flow along the longitudinal axis, is such that its flow velocity is greater than the flow velocity of the backflow of gas 104. Therefore, the curtain can provide an effective barrier to the backflow of gas 104 so that the amount of backflow reaching the window, or the aperture 84, is reduced or eliminated. In this way, any contamination due to the backflow that settles on the window, or a sensitive component of the measurement/imaging device 70 mounted to or behind the aperture, may be at least be reduced so that maintenance intervals are longer, or may be prevented, and thus, for example, the occurrence of false readings of the measurement or imaging device 70 may be reduced or prevented.

A continuous gas curtain may be set up by one or more of the conditions of the aggregate of the intake regions: for example circumferential cover of the intake region (defined by spacing between channels and their cross-sectional area); proximity of the inlet of the channels into the hollow body to the upper aperture; angle of flow with respect to the surface of the window/area of the upper aperture; and flow rate.

The one or more channels 92 may be shaped such that the intake gas flow enters the hollow body along a plane perpendicular to the longitudinal axis, so that the majority of the confluent intake flow is parallel to the surface of the window that may be located in the upper aperture 84, for example. Alternatively, the intake flow may enter the hollow body 82 at an acute angle to the plane perpendicular to the longitudinal axis.

Therefore, the intake region may be shaped so as to angle the flow of gas into the hollow body 82 from the channels 92 away from the perpendicular to the internal wall surface of the hollow body so that, in use, a gas flow component across the upper aperture is created. In other words, the gas flow intake region 86 may be arranged to direct the intake flow of gas into the hollow body 82 along a direction parallel to, or towards, the plane of the upper aperture 84. For example, where the channels are in the form of one or more circumferential slots, the upper and lower edges of the one or more slots may be angled away from the plane perpendicular to longitudinal axis 83, or the plane of the upper aperture 84, of the hollow body so that, in use, a gas flow across the upper aperture is created. The upper and/or lower edges may for example be angled upward towards the upper aperture, an example of which is described in FIGS. 2A to 2C. In FIG. 2A for example, the surface of the lower edge 99 forms an acute angle $\Phi_L < 90°$ with the plane of the upper aperture 84. Meanwhile the surface of the upper edge 98 may be parallel to the plane of the upper aperture 84, i.e. $\Phi_U = 0$ (not labelled as such in FIG. 2A). Overall, the axial component defined by the angle $\Phi$ formed by the intake flow of gas 102 with respect to the plane of the aperture 84 as it enters the hollow body, and which is a result of the arrangement of the gas intake region with respect to the plane of the aperture, will herein be referred to as the "axial component" of the intake flow of gas that is formed with respect to the longitudinal axis of the hollow body as defined by $\Phi$.

In a variant, the surface of the upper edge 98 may form an acute angle $\Phi_U$<90° with the plane of the upper aperture 84, for example such that the angle formed between the plane of the aperture and the lower edge is larger than the angle between the plane of the aperture and the upper edge ($\Phi_L$>$\Phi_U$). This reduces or prevents a 'dead space' of low pressure gas from forming near the window of the surface, between the aperture and the confluence of the predominantly parallel flow component 102 of intake gas.

In addition, or instead, the same effect may be achieved or enhanced by arranging the channels as close as possible to the upper aperture, so that the intake enters the hollow body 82 in close proximity to the upper aperture.

Figure 5A:
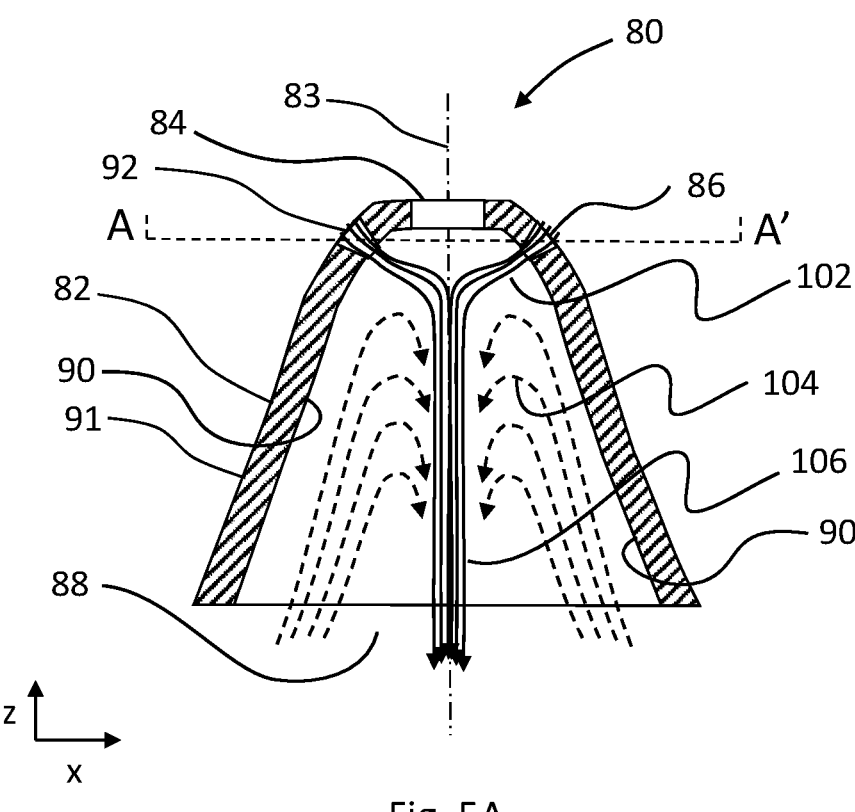
FIG. 5A is a schematic cross-section along the longitudinal axis of a gas flow delivery structure according to an alternative embodiment, having downward directing through-holes.
Figure 5B:
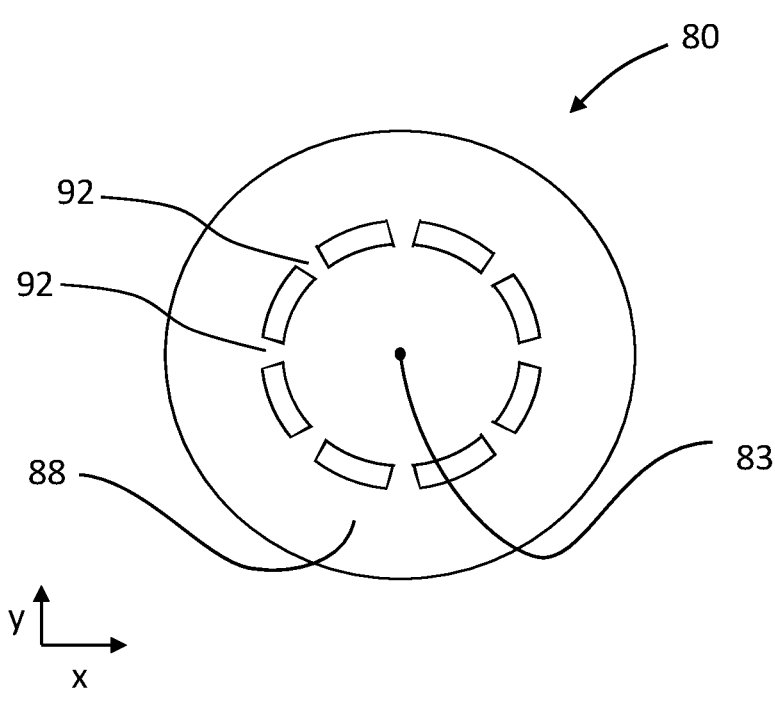
FIG. 5B is a plan view of a cut along section A-A' of the gas flow delivery structure of FIG. 5A.

In some implementations, it may be possible to allow the intake flow to enter at a slight downwards angle, which might generate a region of 'dead space' of low pressure gas near the window of the surface that may be tolerated for measurement accuracy. An example of such an implementation is shown in FIGS. 5A and 5B.

In any of these arrangements, the purpose is to generate a confluent flow at or near the longitudinal axis 83 of the hollow body, that is redirected into an axial downward flow along the longitudinal axis, and wherein the confluent flow component 102 creates a continuous gas curtain of a flow velocity greater than the flow velocity of the backflow of gas 104.

Vanes, Circulating Flow

To help generate a continuous barrier of fast flowing gas from the parallel confluent flow component of the intake flow, the channels 92 may be configured to allow, in use, the flow component to enter the hollow body at an acute angle to a perpendicular to the longitudinal axis, so as to create a circulating flow of gas into the hollow body.

For example, the one or more slots may each comprise one or more vanes angled with respect to the internal surface of the gas flow intake region, so as to create a circulating flow of gas into the hollow body. The angle, or angles, form an acute angle to the perpendicular to the longitudinal axis, so as to create the acute angle to a perpendicular to the longitudinal axis of the flow component. The vanes may extend from the lower edge to the upper edge of the one or more slots. The vanes are preferably angled, for example at or close to 45° to the radial direction to the longitudinal axis, so as to generate a circulatory flow of gas with a parallel flow component that is in addition substantially parallel to an inner circumferential area of the internal wall of the hollow body 82 so that the velocity vectors have radial and tangential components in a plane perpendicular to the longitudinal axis 83. It is thought that this has two effects—the intake gas sweeps a larger area that is parallel to the plane of the upper aperture before it is redirected downwards to form the axial flow of gas 106 within the hollow body 82, thereby improving the continuity of the barrier generated by the parallel component of the intake gas; and to improve the downward axial flow of gas 106 so that it is a spatially defined flow with a slow (long period) swirling (spiralling) element. It was found that by angling the vanes, for example aligning the vanes radially so they are arranged at 0° to the radial direction of the longitudinal axis, the axial flow of gas 106 is less defined and may pose a less effective barrier between the backflow gas and the upper aperture/window.

Channels in the Form of Through-Holes

Instead of at least one or more slots arranged along a circumference of the hollow body, the one or more channels of the gas flow intake region may comprise a plurality of through-holes. Implementations of this are shown in FIGS. 4 and 5.

Figure 4A:
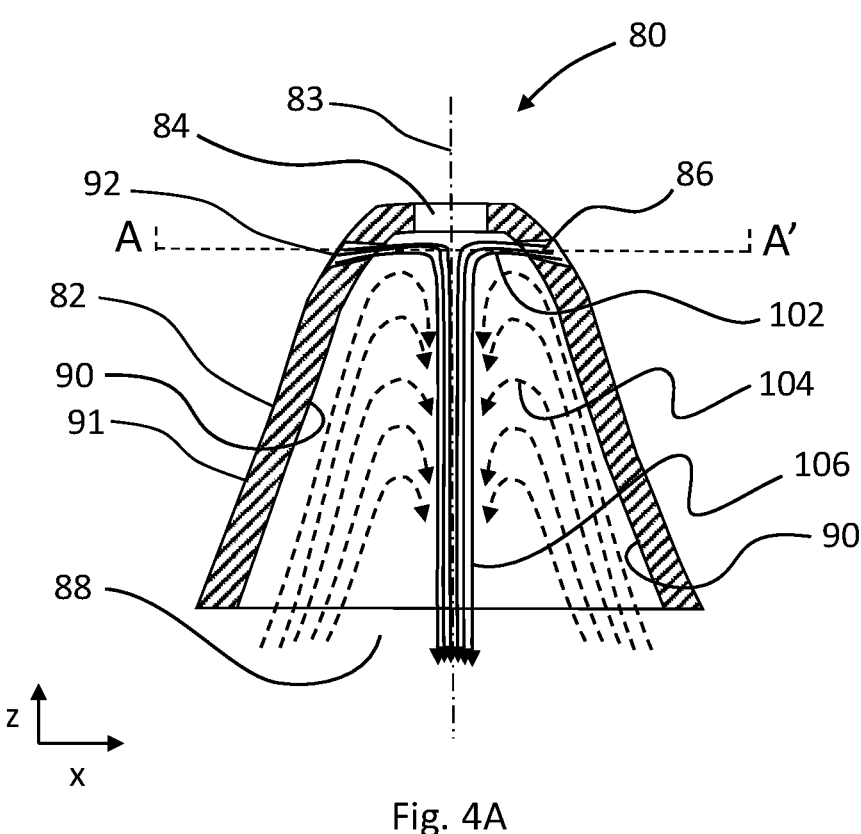
FIG. 4A is a schematic cross-section along the longitudinal axis of a gas flow delivery structure according to a variant of the configuration shown in FIG. 2A, having through-holes.
Figure 4B:
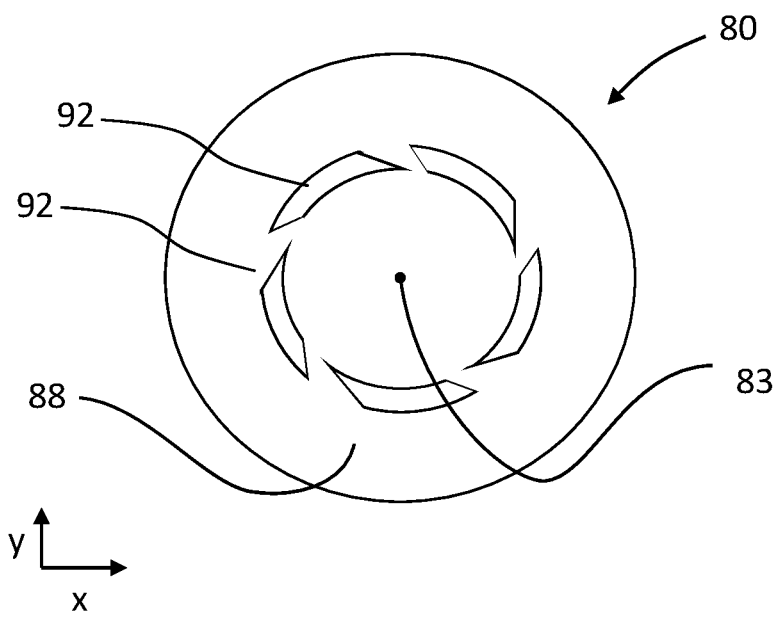
FIG. 4B is a plan view of a cut along section A-A' of the gas flow delivery structure of FIG. 4A.

FIG. 4A shows a variant of the structure of FIG. 2A. While similar in cross-sectional view along the longitudinal axis 83, the channels 92 are in the form of through-holes, as may be seen in the representation in FIG. 4B of the cross section along line A-A'. The through-holes are angled upward so that the gas entering the hollow body from the channels is directed towards the aperture 84, which may be a window such as a germanium window for a thermal camera enclosure. Additionally, although not essential, the through-holes are arranged at an angle to the radial direction of the circumference over which the through-holes are arranged, so that a similar effect to the vanes 96 in slots 92 may be achieved. The gas would thus enter the hollow body 82 with a parallel flow component 102 that in addition also has a component that is parallel to a circumferential region of the internal wall of the hollow body (e.g. a tangential velocity component, perpendicular to the radial direction), at least near the entry point into the hollow body 82. This may improve the continuity of a gas curtain that, in use, is generated by the parallel confluent flow component. In addition, as before, in use, the velocity of the parallel confluent flow component 102 and of the downwards axial flow of gas 106 generated as a result of the confluence is arranged to be higher than the velocity of the backflow of gas 104 that travels upwards along the internal wall 90. This provides for a gas curtain that may present an effective barrier to dust and fumes for the window at the aperture 84 because the backflow cannot break through it.

The channels 92 may further have a cross section that decreases from the outer wall to the internal wall 90, so that gas travelling through the channel gains velocity from the outer wall to the internal wall. This may be a preferential arrangement where a faster flow of gas is required to provide for a suitable velocity difference between the parallel confluent flow component and the backflow generated by the intake gas.

In some implementations of the hollow body, the gas flow intake region may be arranged to direct the intake flow of gas into the hollow body along a direction parallel to, or towards, the plane of the upper aperture.

For example, the through-holes may point upwards to direct the intake flow of gas up towards the window. This reduces or prevents any dead space of low pressure gas directly beneath the window which might ultimately lead to contamination of the window. The through-holes may instead point directly towards the longitudinal axis so that the intake flow is parallel to the window surface, i.e. it has a substantially, if not entirely, parallel confluent flow component.

Alternatively, the through-holes may have a small downward pointing component. Some benefit of providing a barrier between the backflow of gas and the window/upper aperture of such an arrangement may be derived as long as for example the flow rate and continuity of the curtain created is high enough to prevent the backflow gas from breaking through the curtain. This is shown in FIGS. 5A and 5B. Channels 92 are in the form of downward angled through-holes; in other words, the gas flow intake region may be arranged so that in use, the intake of gas is directed downwards into the hollow body 82 at an intake angle of greater than zero degrees with respect to the plane of the upper aperture.

Figure 7:
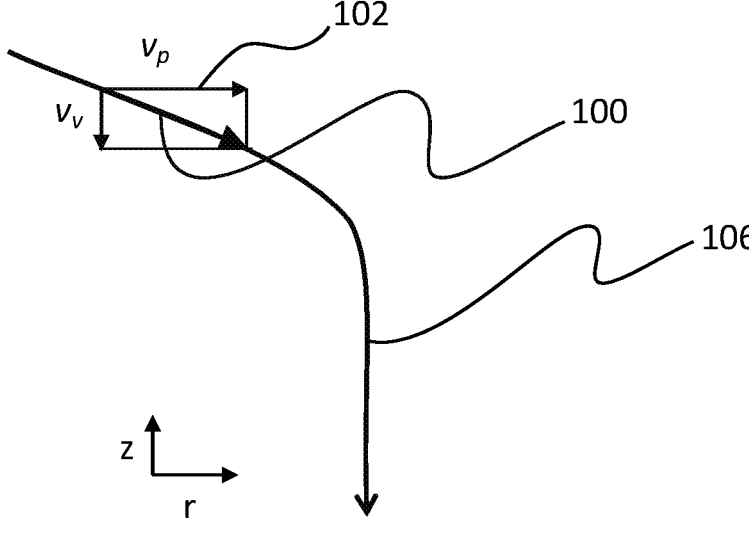
FIG. 7 is a schematic illustration of flow components according to the gas flow delivery structure of FIG. 5.

In use, a small downward angle, for example equal to or less than 25 degrees with respect to the plane of the upper aperture, causes a flow of intake gas 100 to enter the hollow body 82 with a flow component 102 that is substantially parallel to the plane of the upper aperture, from the opposing sides of the hollow body, and to come into confluence within the hollow body. The confluent flow of intake gas 100 is redirected to form a substantially axial flow 104 of gas along the longitudinal axis, and a backflow 104 of gas near the internal wall 90 of the hollow body. Where the velocity of the backflow 104 is relatively low in comparison to the velocity of the intake flow 100, the upper aperture 84 is substantially shielded from the backflow 102 by the confluent flow of intake gas 100. The flow component 102 that is substantially parallel to the plane of the upper aperture is illustrated in FIG. 7. Similar to FIG. 6, FIG. 7 shows one flow line after entry into the hollow body as intake flow 100 having incremental parallel and vertical flow components $v_p$, $v_v$ of an intake flow component $v_{100}$. In this example, the intake flow 100 is directed downwards away from the upper aperture 84 before being redirected due to confluence to form a substantially downward, axial flow 106 of gas along the longitudinal axis. It can be seen that for the parallel flow component, 102, the parallel velocity component is larger than the vertical velocity component: $v_p > v_v$. Thus, the flow component 102 is substantially parallel to the plane of the upper aperture.

The channels 92 in the form of through-holes further decrease in cross-sectional area with distance from the outer wall 91 to the internal wall 90 of the hollow body 82. Thus, the channels 92 may be arranged so that in use, the rate of flow of gas increases as the intake gas 100 flows through the channel.

In addition to decreasing in dimension along the longitudinal axis direction, the cross section may also decrease along the radial direction towards the longitudinal axis. This is indicated in FIG. 5C for through-holes 92. This increases the flow velocity of the intake flow and may improve the confluence of the intake flow, and of the parallel component of the intake flow. The downward angle may for example be around 20 degrees, for eight holes having a 4 mm diameter inlet into the hollow body and evenly arranged along a circumferential line in proximity to a window located within the upper aperture 84 and.

Although the figures show five or eight through-holes arranged along a circumferential line of the hollow body, this is for illustrative purposes only, and any number of channels, in the form of slots or through-holes, may be provided.

The through-holes may preferably be located as close as possible to the lower surface of the window or aperture. The cross-sectional area of the holes may decrease from the outer wall to the internal wall 90 of the hollow body so that the intake gas accelerates as it passes through the through-hole channel 92. The through-holes may further, or instead, be angled with respect to the radial direction of the circumferential line over which the through-holes are located. In other words, they may be angled away from the direction of the plane of the upper aperture. In some variants, the through-holes may be angled towards the plane of the upper aperture. Additionally or instead, the through-holes may be arranged at an acute angle to the perpendicular to the longitudinal axis, so as to create the circulating flow of gas into the hollow body.

In some implementations, the through-holes may be arranged over a majority of a circumferential line around the axis of the hollow body. This means that at least 50% of the circumferential line over which the through-holes are arranged is covered by through-holes.

Experimental Results from Certain Prototypes

An experimental hollow body having an intake area 86 in the form of a circumferential slot with vanes was tested in an apparatus 1. The hollow body had the following dimensions:

Inner diameter of lower aperture: 90.8 mm
Inner diameter of upper aperture: 25.5 mm
Field of view of the internal wall: solid angle of 42°
Vertical distance of slot below plane of aperture: 1 mm
Distance along longitudinal axis from lower aperture to plane of upper aperture: 70 mm
Slot height (gap of intake region along the longitudinal axis): 2.2 mm
Slot depth: 7.7 mm
Vanes: 8, spaced at regular intervals along a circumferential line of the hollow body located 1 mm below the plane of the window. The vanes were angled at θ=45 to the radial direction.

The upper and lower edge were parallel to the plane of the window (Φ=0).

The intake region was supplied from a gas supply chamber 200, where the pressure generated by a fan within the gas supply chamber was 300 Pa.

The flow trajectory generated within the hollow body was suitable for protecting a germanium window 72 mounted within the upper aperture 84 sufficiently to significantly improve (prolong) the reliability of temperature profile measurements of the build bed surface 12 from a thermal camera 70 mounted above the window.

CFD Simulations

Solidworks Flow Simulation 2019 for computational fluid dynamics (CFD) analysis was used to model flow velocity (trajectory and speed) within the hollow body 82 based on an imposed pressure difference, equal to a pressure of around 300 Pa in the supply chamber 200 and atmospheric pressure below the interior of the hollow body, i.e. at the interface to the work space 4.

In a first simulation of a hollow body of dimensions as described in the experimental section above, and having similar constraints in respect of pressure, a fast-moving flow of intake gas was set to enter the hollow body with a flow component that was substantially parallel to the plane of the upper aperture (fitted with a window). The flow was seen to come into confluence within the hollow body and below the window; and to be redirected to form a substantially axial flow of gas along the longitudinal axis that persisted at least along the interior of the hollow body. Furthermore, a much slower moving backflow of gas compared to the intake flow (and the axial flow) was generated near the internal wall 90 of the hollow body. The simulation therefore suggests that the upper aperture (obstructed by the window) was substantially shielded from the backflow by the intake flow. Furthermore, the axial flow of gas was seen to have a long period spiralling component. The simulation was repeated with slot heights ranging from of 0.5 mm to 3.5 mm. While the general flow pattern remained as described in this paragraph, the axial flow was seen to broaden with increasing slot height.

In a second simulation, a hollow body with dimensions similar to those in the experimental section and having an intake region shaped in the form of eight through-holes was tested, the through-holes being arranged at regular intervals along a circumferential line of the hollow body around 9 mm below the plane of the window. The through-holes had a constant diameter of 4 mm and were angled away (downwards, similar to FIG. 5A) from the plane of the window by $\Phi=-20°$ and furthermore angled by an angle $\theta=45°$ to impose a tangential component to the intake flow. The inclination of the through-holes vertically meant that the intake gas flow entered the hollow body around 9 mm below the plane of the window. Imposing the same pressure conditions as before, the flow pattern inside this hollow body variant was seen to create a fast flowing 'plug' of gas beneath the window, with a small dead space of low velocity gas between the window and the plug. The flow was seen to come into confluence within the hollow body below the window; and to be redirected to form a substantially axial flow of gas along the longitudinal axis that persisted for a sufficient portion to be recognised as such (in this case for over 30% of the vertical distance between the window and the lower aperture) along the interior of the hollow body. Furthermore, a much slower moving backflow of gas compared to the intake flow (and the axial flow) was generated near the internal wall 90 of the hollow body. The simulation therefore suggests that the upper aperture (obstructed by the window) was substantially shielded from the backflow by the intake flow.

Figure 9A:
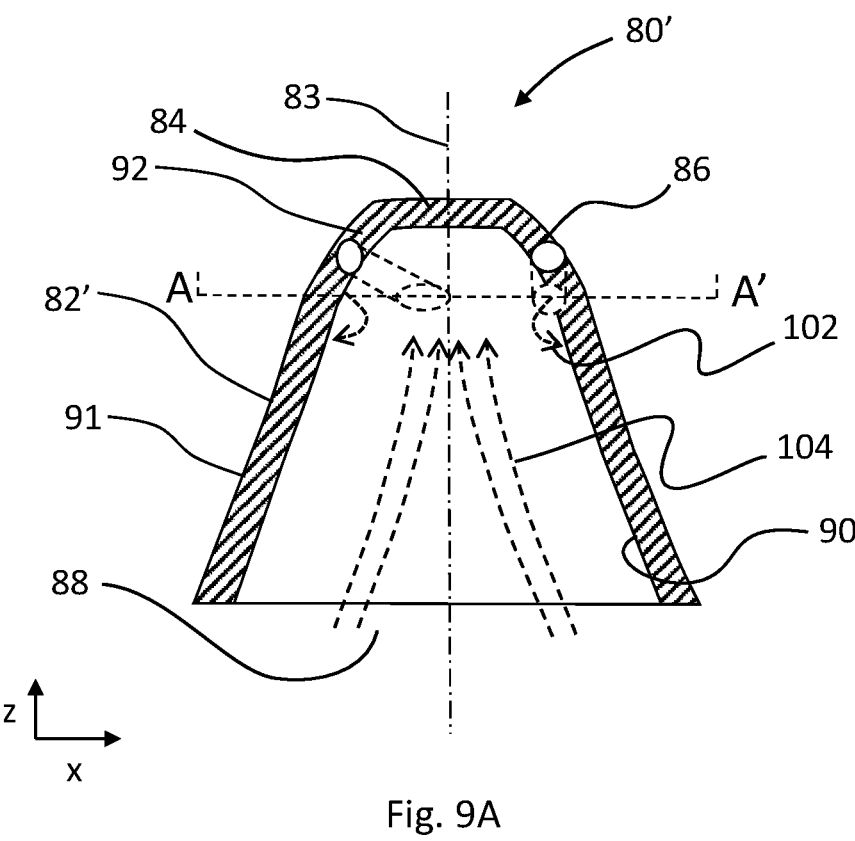
FIGS. 9A and 9B are schematic illustrations of intake flow lines from a gas flow delivery structure having an intake region in the form of tangential holes, that does not form an embodiment of the present invention.
Figure 9B:
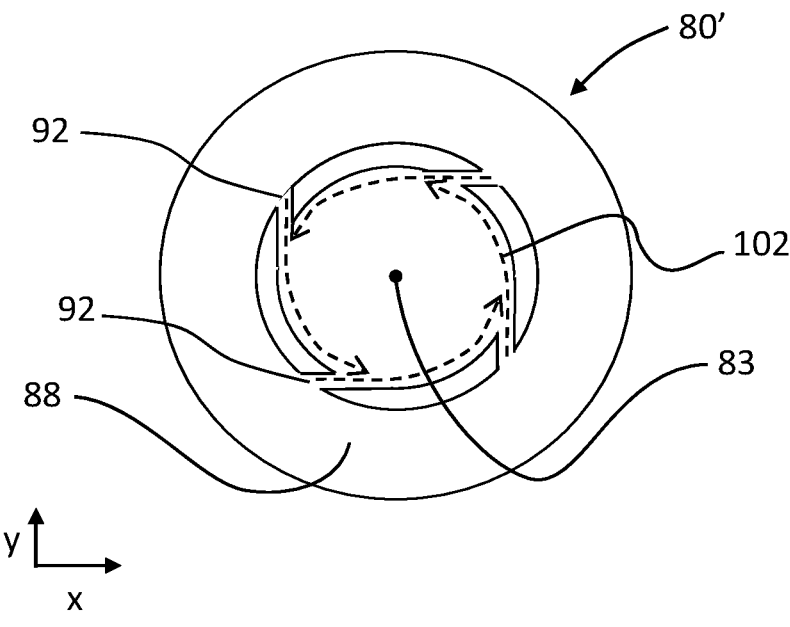

In a third simulation, a hollow body with dimensions similar to those in the experimental section and having an intake region shaped in the form of four through-holes was tested, the through-holes being arranged at regular intervals along a circumferential line of the hollow body around 12 mm below the plane of the window. This structure 80' is illustrated in FIGS. 9A and 9B. All labels apply equally although the structure 80' does not form an embodiment of the present invention. The through-holes 92 had a constant diameter of 3 mm and were angled away (downwards, similar to FIG. 5A) from the plane of the window by $\Phi=-15°$, as illustrated in FIG. 9A, and furthermore tangentially angled by an angle $\theta=90°$, as illustrated in FIG. 9B, to impose a substantially tangential component to the intake flow with a substantially zero radial component.

Imposing the same pressure conditions as before, the flow pattern inside this hollow body 82' was seen to create a fast-flowing intake flow of gas 102 along the internal wall of the hollow body having a spiralling component, and a slow moving backflow 104 upward along the axial direction. The simulation therefore suggests that in this structure having a substantially zero radial component of intake flow, a window located at the aperture 84 was not shielded by the intake flow 102 from the backflow 104 of gas.

The results of the third simulation were confirmed by experiment similar to the experimental conditions above, in that the hollow body 82' with four tangentially and downwards angled holes was found to provide poor protection from contamination from fumes and dust in the environment below the hollow body for the germanium window of a thermal camera. For a certain geometry of the hollow body the tangential component may be suitably chosen to ensure that the intake gas flow does not hug the internal wall of the hollow body but instead is able to detach from it to come into confluence within the hollow body.

General Considerations

In order to improve or promote the effect of the structure on the intake flow, according to the above embodiment and its implementations, when in use with suitable flow rates, the hollow body 82 may be arranged such that the intake flow 100 creates a continuous curtain of high velocity flowing gas parallel to and underneath the upper aperture 84, or angled down from the plane of the upper aperture 84. The velocity of the gas flowing parallel to and underneath the upper aperture 84 is suitably high to prevent the backflow of slow moving gas upwards near the internal wall 90 of the hollow body 82 from breaking through the continuous wall/curtain. This may be ascertained by simple routine experimentation.

Preferably, in use, the intake flow 100 may enter the hollow body 82 adjacent the plane of the upper aperture 84. This provides for an improved barrier created by the parallel confluent flow component 102 and reduces or avoids 'dead space' directly underneath the aperture or window.

It may further or instead be beneficial that the hollow body be generally bell-shaped or cone-shaped so as to promote the beneficial flow profiles as described above.

In the above implementations, the gas flow intake region of the structure 80 may be supplied with intake flow of gas 100 by a gas supply chamber. This is illustrated in FIGS. 5A, 5B and 5C. Applicable to all implementations, the structure 80 may comprise a gas supply chamber 200 adjacent to the outer wall 91 of the structure, for supplying the gas flow intake region 86 with the flow of intake gas 100. The gas supply chamber 200 surrounds the circumferential region comprising the channels 92 and sealingly engages with the outer wall of the hollow body 82. To one side of the hollow body a gas inlet 202 is located. Preferably, the gas inlet is arranged so as to supply gas into the chamber in a direction non-parallel to the cross-sectional plane comprising the channels 92. For example, the inlet 202 may supply gas in a direction substantially parallel to the longitudinal axis 83 of the hollow body. In the implementation of FIG. 3A, shown in cross section along the longitudinal axis of the hollow body and in a side view of the gas supply chamber, the inlet 202 supplies gas from a floor of the chamber 200 so that the gas is directed against the roof of the chamber and turbulence is created. Preferably therefore, the gas supply chamber 200 may have a gas inlet 202 that is arranged to direct gas into the chamber in a direction substantially parallel to the longitudinal axis 83 of the hollow body 82, so as to cause turbulent flow of the gas as it passes through the gas supply chamber from the inlet and enters the gas flow intake region 86 of the hollow body. Preferably the inlet is located close enough to the gas intake region so that turbulence persist before meeting the channels and so as to avoid a highly directional flow meeting the channels from one side. Other arrangements for supplying gas into the chamber may be envisaged; for example the gas may be introduced from various inlets surrounding the gas intake region.

Figure 8A:
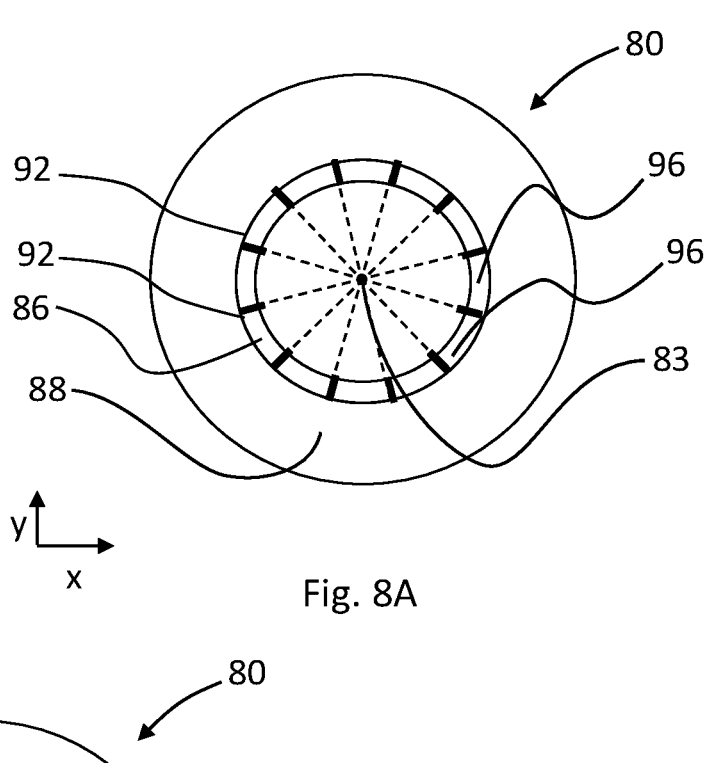
FIGS. 8A to 8C are schematic illustrations of intake flow lines from a slot shaped intake area of variants of the plan view of FIG. 2B, having vanes aligned at different angles to the radial direction.
Figure 8B:
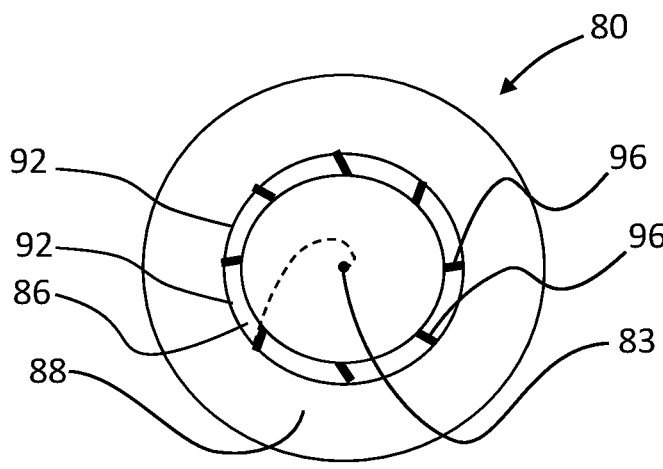
Figure 8C:
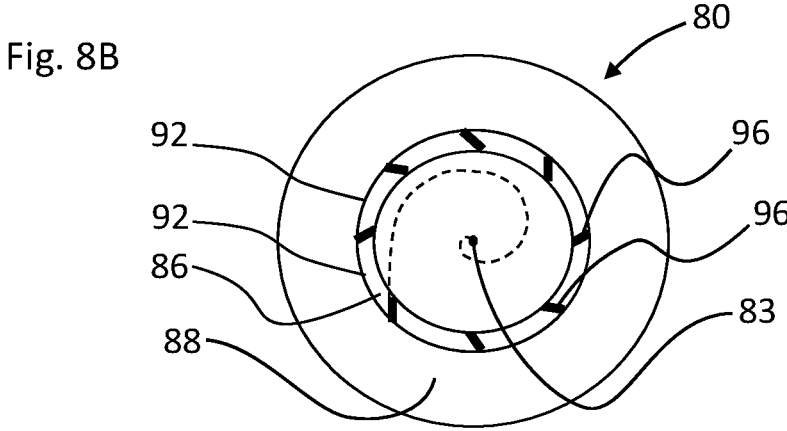

FIGS. 8A to 8C are variants of the plan view of FIG. 2B of a hollow body 82 comprising a circumferential slot having vanes, and illustrate the effect of angle, with respect to the radial direction of the axis of the hollow body, of the intake gas entering the hollow body from the intake region, and how the angle is believed to affect the continuity of the curtain of intake gas coming into confluence within the hollow body.

FIG. 8A shows flow lines of intake gas for vanes that are arranged radially with respect to the longitudinal axis 83. In terms of a polar coordinate system, the flow lines have a purely radial component and a tangential component and, $v_t=0$, or $\theta=0$ according to the convention indicated in FIG. 2B, where $\theta$ is the angle of the vane with respect to the radial direction. For these vanes, in an ideal system, the downward axial flow that is formed after confluence of the radial flows does not possess any circulating component or swirl. From experimental results, similar arrangements that direct intake flow without a tangential component into the hollow body result in an axial flow of poor definition, i.e. the axial flow is spread out within the hollow body. It is also believed that the curtain that is formed by the radial flow has moderate or poor continuity.

An improvement is shown in FIG. 8B, where 90°>θ>0°, i.e. the vanes are arranged at greater than 0° to the radial direction, but at less than for example 45°. A small rotational component is introduced to the intake flow and it can be seen how the flow lines (one only shown for illustrative purposes) is longer than the radial flow lines of FIG. 8A. The intake flow in FIG. 8B thus sweeps a larger area of the region under the window, and may thus be expected to provide for better continuity in the gas curtain generated by the intake flow than a purely radial intake flow.

FIG. 8C illustrates vanes arranged at 90°>θ>>45°. The Figure illustrates, without reference to specific angles, how the flow lines at least initially, at entry into the hollow body, hug the internal wall of the hollow body over a circumferential section. It is believed that for angles θ>>45°, the higher the tangential component, the greater the distance over which the intake gas flow hugs the internal wall, resulting in an increasingly poorly defined downward axial flow. As the third simulation and corresponding test above suggests, a tangential intake angle of θ=90° according to a structure 80' of FIGS. 9A and 9B was not found to result in confluence of intake gas flow and did not protect a window at the aperture 84 from the environment in the apparatus 1.

To avoid the intake gas flow hugging the internal wall and to promote confluence within the hollow body, the tangential component θ at which the intake gas flow enters the hollow body may preferably be arranged to be less than 80°. Optionally, the range of θ may be such that 80°>θ≥45°, however smaller angles of θ than 45° may be suitable, for example 80°>θ≥15°. It should be appreciated that a similar, rotationally opposite, intake flow may be created within the hollow body having tangential components −80°<θ≥−15°. From experimental results and simulations, θ may preferably be at or near 45°. Additionally, or instead, the intake region may be arranged so as to generate an axial component of intake flow preferably defined by a downward component of no more than Φ=|20°|, and preferably the angle of intake gas flow lies within the range of −20°≤Φ≤20° (upward or downward component).

Alternatively, the supply chamber may be an annular ring encompassing the circumferential area of the wall comprising the gas intake region, and gas may be supplied from a plurality of inlets arranged radially along the annular chamber.

The gas supply chamber forms a flow path, for example an annular flow path, surrounding the upper portion of the hollow body, so that the channels 92 are supplied from a common annular flow path. The common flow path may preferably have a cross-sectional area that is significantly larger than the cross-sectional area of the channels. In other words, the flow resistance of the common channel is very low compared to the aggregate flow resistance of all of the channels. In this way, a relatively uniform intake flow 100 may be arranged from channel to channel. The flow pattern is illustrated in FIG. 3C by way of example using the arrangement of the slot shaped intake region of FIG. 2B, reproduced in relation to the supply chamber in FIG. 5B. The intake regions 86 are in the form of a series of circumferential slots separated by vanes 96. The vanes are angled with respect to the radial direction of the longitudinal axis 83 so as to generate a circulatory flow of intake gas into the hollow body 82. This is shown with respect to the parallel confluent flow component 102 emerging from each channel 92 with an initial substantially parallel component to the internal wall 90 of the hollow body, generating a swirling flow pattern that is confluent at or near the longitudinal axis and near the upper opening.

The direction of gas after entering the supply chamber from the inlet and after being redirected by the chamber roof is indicated as flow lines 108. Due to turbulence that the inlet gas experiences, the overall flow front advancing towards the circumferential area of the slots has reduced directionality which might otherwise strongly affect the relative flow through the different slots. In other words, turbulence may reduce the difference in gas flow between slots located at opposing sides of the longitudinal axis.

Secondary Intake Gas Flow: FIGS. 10A to 10C and FIGS. 11A to 11B

In some applications the hollow body may be formed of a plastic material or a material deformable by heat. Alternatively, it may be in close thermal contact with components sensitive to excessive heat. Some process conditions may cause the environment near the hollow body to be so hot that the hollow body risks losing its shape, or passes on heat to an adjacent component. In such cases it may be beneficial to provide a secondary intake region, represented for example by a set of secondary channels located nearer the lower aperture of the hollow body than the gas intake region. For example, a set of secondary channels may be provided closer to the lower aperture 88 than the primary inlet channels 92. The secondary intake region is arranged so as to flow cooling gas along the surface of the internal wall 90 of the hollow body, forming a region close to the internal wall that is of a temperature low enough to protect the hollow body from thermal deformation.

Any arrangement of secondary channels or slots as described for the gas intake region 86 may be suitable, where the arrangement further provides a flow along the internal wall 90, and preferentially a flow slightly angled downwards towards the lower aperture of the hollow body, so as to create a downward circulating flow along the internal wall surface.

Figure 10A:
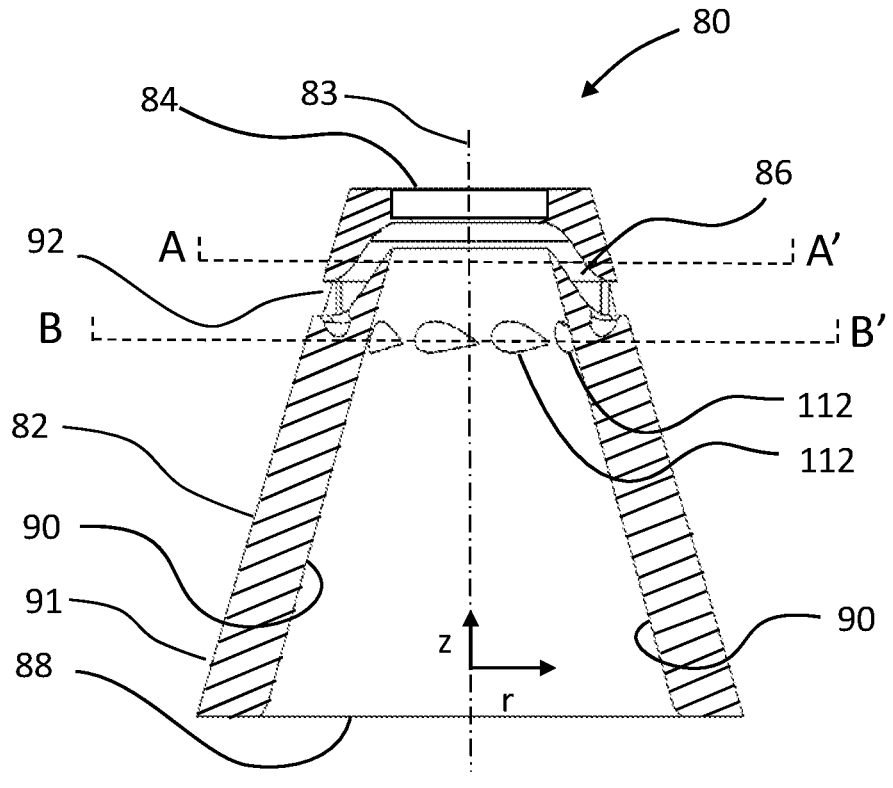
FIG. 10A is a schematic cross-section along the longitudinal axis of a gas flow delivery structure according to a variant of FIG. 2A, comprising a set of secondary inlets.

A possible implementation is shown in FIG. 10A, which is a variant of the embodiment as described with relation to FIG. 2A, although the secondary intake region may readily be applied to any of the embodiments and their variants described herein.

FIG. 10A is a schematic cross-section along the longitudinal axis of a gas flow delivery structure according to a variant of FIG. 2A, and the description regarding like elements in FIG. 2A equally applies to FIG. 10A. Thus, with regard to FIG. 10A, the gas intake regions 86 provided by the channels 92 are illustratively represented in FIG. 10B, which illustrates a cut of a circumferential slot along section A-A' (indicated in FIG. 10A) through the hollow body 82. The intake regions 86 are in the form of a series of circumferential slots separated by vanes 96. The vanes are angled with respect to the radial direction of the longitudinal axis 83 so as to generate a circulatory flow of intake gas into the hollow body 82. This is shown with respect to the parallel confluent flow component 102 emerging from each channel 92 with an initial substantially parallel component to the internal wall 90 of the hollow body, generating a swirling flow pattern that is confluent at or near the longitudinal axis and near the upper opening.

Further shown in FIG. 10A is a secondary intake region illustrated in the form of through-holes forming a set of secondary channels 112 that are formed through the hollow body at an inward angle that is an acute angle to the tangent to the circumference located at the secondary gas intake region. In addition, the secondary channels 112 may have a downward component so as to direct the gas along the internal wall 90 and downward towards the lower aperture 88. This may have the effect of cooling a substantial area of the surface of the internal wall 90, and preferably the surface extending from the lower aperture 88 to the secondary channels 112.

The intake gas may be supplied to the secondary intake region by a separate gas supply, or it may be supplied by a common supply that also supplies the primary intake region 86, as is shown in FIG. 10A. Depending on the requirements, a common supply may create less complexity and cost, while a separate supply may more easily allow control of the two flows of gas.

FIG. 10A shows the secondary gas intake region arranged close below the primary gas intake region. The specific arrangement will depend on for example the process conditions in the working space 4, and the volume flow and temperature of the intake gas as well as the design of the secondary set of channels 112. In some variants, the secondary gas intake region may be located half way along the longitudinal axis 83 of the hollow body 82.

Figure 10B:
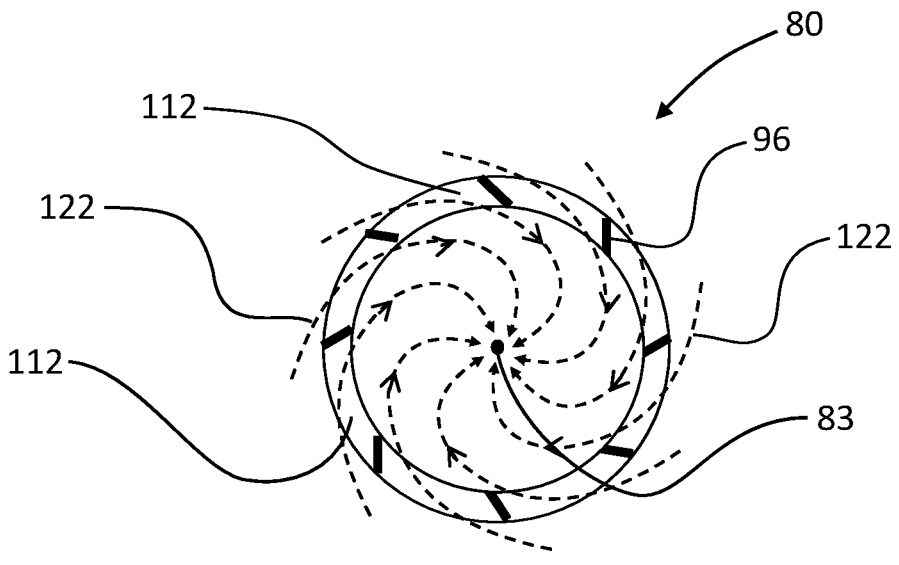
FIGS. 10B and 10C are plan views of cuts along sections A-A' and B-B' of FIG. 10A.
Figure 10C:
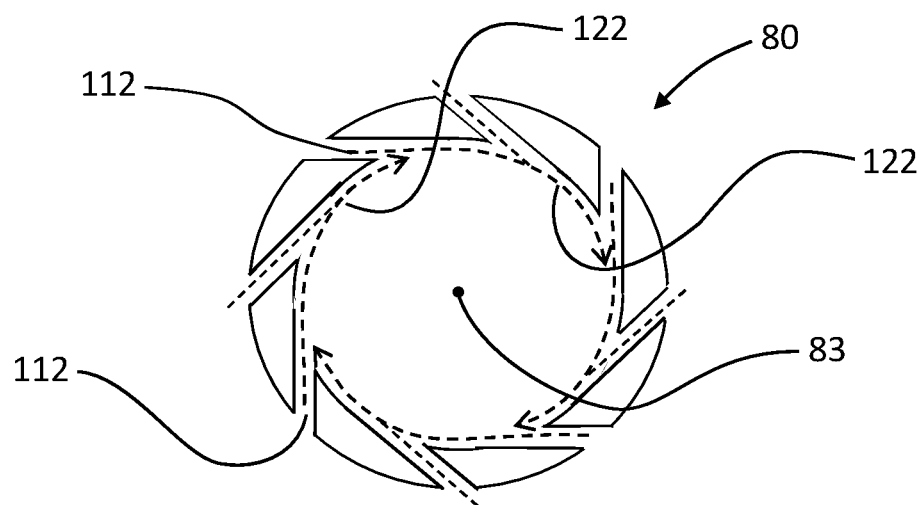

The shape of the secondary set of channels 112 of the variant of FIG. 10A is further illustrated in FIG. 10C, which is a circumferential cut through the hollow body 82 of the structure 80 along section B-B' indicated in FIG. 10A. The cut shows the shape of the secondary channels 112 through the hollow body 82, and the resulting gas flow indicated by arrows 122 circulating along the internal wall 90. The gas flow may have a downward component for channels 112 that are angled downward.

In the variant of FIG. 10A to 10C, the secondary channels 112 are arranged such that the circulating gas flow introduced by the secondary intake region is rotating in the same rotational sense as the primary gas flow generated by the vanes. In other words, the vanes 96 of the primary intake region and the channels 112 of the secondary intake region 116 are angled in the same rotational sense.

Figure 11A:
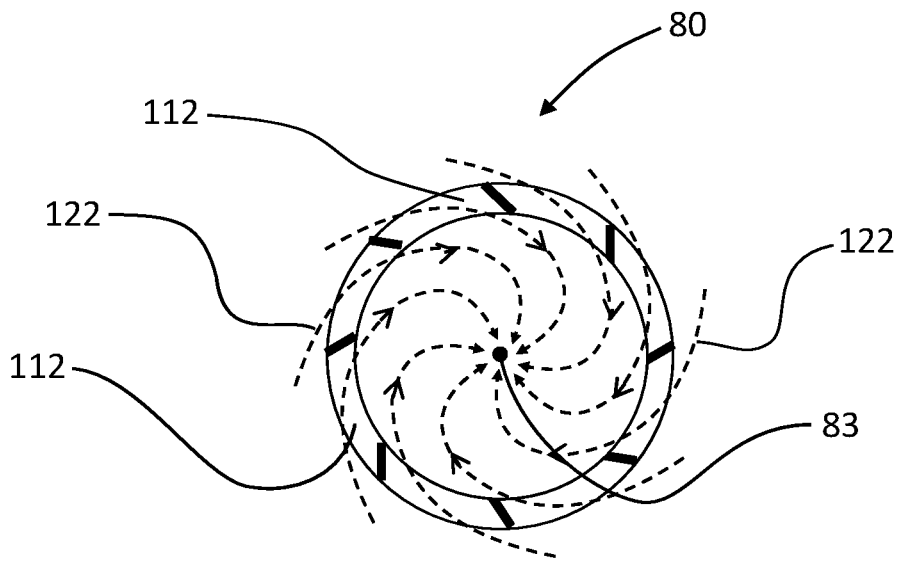
FIGS. 11A and 11B are plan views of cuts along sections A-A' and B-B' of a variant of FIG. 10A.
Figure 11B:
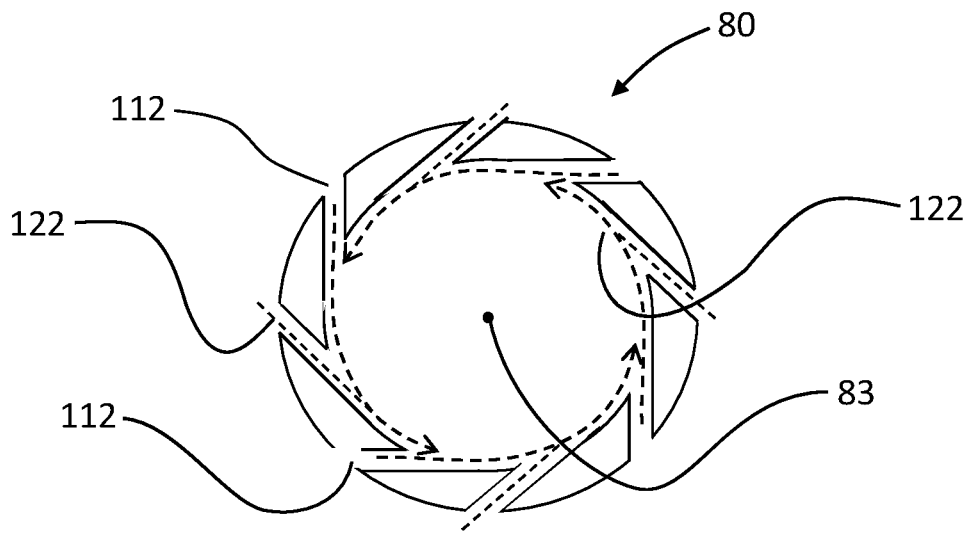

The inventors have found that this is however not necessary. Instead, the secondary channels 112 may be arranged such that the circulating gas flow introduced by the secondary intake region 116 is rotating in the opposite rotational sense to that of the primary gas flow generated by the vanes 96. In other words, the channels 112 of the secondary intake region are angled in the opposite rotational sense to the vanes 96 of the primary intake region 86. This is illustrated in FIGS. 11A and 11B, showing the arrangement of the vanes 96 along a cut A-A' and the arrangement of the secondary channels 112 along a cut B-B' in a variant for which the section are located similar to those indicated in FIG. 10A. It has been found that a counter-rotating flow further reduces the impact of the confluent flow on the build bed surface 12.

Figure 3B:
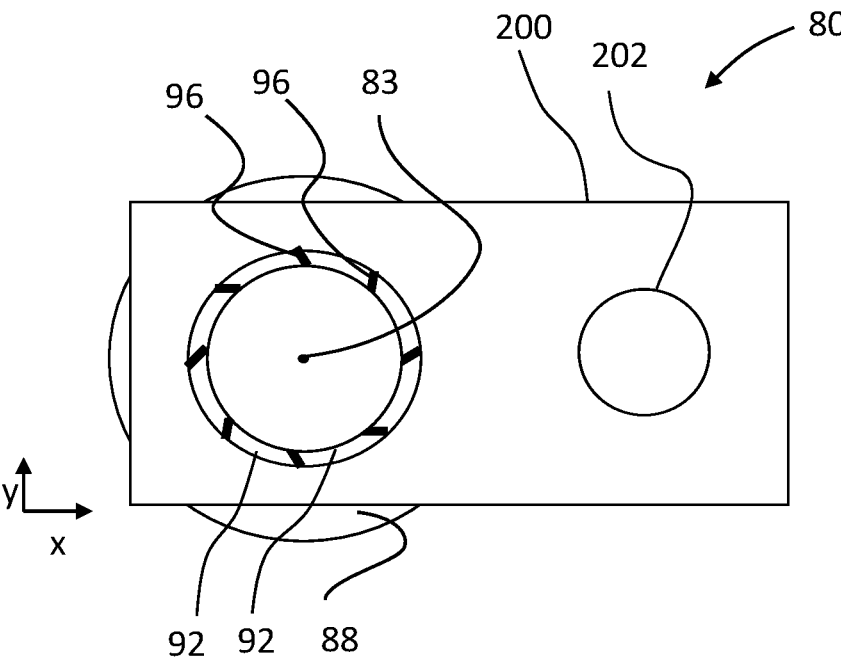
FIG. 3B is a plan view of a cut along section A-A' of FIG. 3A.
Figure 3C:
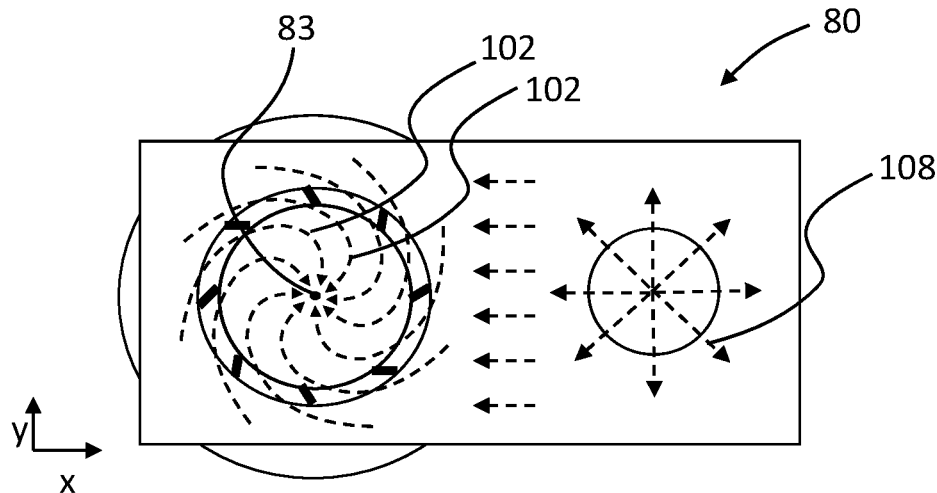
FIG. 3C is the same as FIG. 3B and showing gas flow lines when the gas flow delivery structure is in use.

The gas supply may be arranged in the form of a gas chamber similar to that described with respect to FIGS. 3A to 3C to form a flow path, for example an annular flow path, surrounding the upper portion of the hollow body, so that the primary channels 92 and the secondary channels 112 are supplied from a common annular flow path.

Thus, the structure as described with respect to the embodiments disclosed herein may, in variants, further comprise a secondary gas flow intake region 116, wherein the secondary gas flow intake region 116 is provided on opposing sides of the hollow body 82 when viewed in cross-section along the longitudinal axis 83, and comprises one or more secondary channels 112 configured to allow, in use, a secondary flow of intake gas to enter the hollow body 82 with a secondary flow component that is predominantly parallel to the internal wall of the hollow body.

The one or more secondary channels 112 of the secondary gas flow intake region 116 may comprise a plurality of secondary through-holes arranged at an acute angle to the perpendicular to the longitudinal axis 83, so as to create the secondary flow component that is predominantly parallel to the internal wall of the hollow body.

In variants, each of the one or more secondary channels 112 of the secondary gas flow intake region 116 may be configured as an elongate secondary through-hole extending in a direction of elongation along the perimeter line of the hollow body 82 (or the circumference line, where the hollow body is bell shaped or cylindrical shaped).

Optionally, the or each elongate secondary through-hole 112 may be bounded by two side walls, wherein at least one of the two side walls are arranged at an acute angle to the perpendicular to the longitudinal axis 83.

Optionally, the or each elongate secondary through-hole 112 may extend substantially perpendicular to the longitudinal axis of, and through the wall of, the hollow body 82.

The edges of the or each elongate secondary through-hole 112 may be angled away from the perpendicular to the internal wall surface of the hollow body so that, in use, the secondary flow component further comprises a downward component toward the lower aperture of the hollow body.

The or each elongate secondary through-hole may extend over a majority of the perimeter line.

The or each elongate secondary through-hole 112 may comprise one or more secondary vanes (not illustrated but these may in principle be arranged similarly to the vanes 96 in the primary intake region) arranged at an acute angle to the perpendicular to the longitudinal axis, so as to direct the secondary flow component predominantly parallel to the internal wall of the hollow body.

Generally, the secondary channels 112 may be arranged such that, in use, the secondary flow of gas flows in a rotational sense opposite to that of the primary flow of gas.

The supply chamber 200 as disclosed herein with reference to FIGS. 3A to 3C may further be configured to supply the secondary gas flow intake region 116 with the secondary flow of intake gas.

The supply chamber 200 may further be configured to supply the secondary gas flow intake region 116 with the secondary flow of intake gas at a common inlet common to the primary gas flow intake region 86 and the secondary flow intake region 116.

It is not essential that the primary flow of gas is a circulatory flow of gas. Instead, the secondary intake region may be provided to variants in which the primary intake region does not generate a circulatory flow in the hollow body.

It should be noted that references to 'slots' herein are intended to mean generally elongate through-holes extending in a direction of elongation along the perimeter line. These elongate through-holes need not be of rectangular shape. Such an elongate through-hole may bounded by two side walls, wherein at least one of the two side walls are arranged at an acute angle to the perpendicular to the longitudinal axis so as to generate a circulating flow or intake gas.

Apparatus and Method

FIG. 3A further indicates how a measurement device, such as a thermal camera 70, may be protected from the environment of the working space of the apparatus 1. The thermal camera 70 in this example is located within a camera housing 74 mounted to the hollow body. A window 72 is located in the region of the upper aperture and seals the housing against the interior of the hollow body. In the case of a thermal camera, this may be a germanium window for transmitting infrared radiation. The germanium window 72 provides an obstruction to the intake flow of gas 100 and helps redirect the substantially parallel confluent flow components 102 to form the axial flow of gas 106 along the longitudinal axis of the hollow body. Furthermore, the flow components 102 substantially parallel to the plane of the upper aperture are brought into confluence within the hollow body 82 by providing an appropriate flow rate through the channels of the intake regions. A backflow of gas 104 flowing upwards near the internal wall 90 of the hollow body is generated. Where the velocity of the backflow is relatively low in comparison to the velocity of the intake flow 100, the window located at the upper aperture 84 is substantially shielded from the backflow by the intake flow. Preferably, the channels and the flow velocities are arranged such that the confluent flow of intake gas 102 forms a continuous curtain of fast-flowing gas that poses a barrier the backflow may not break through, this protecting the window from fumes and dust and improving reliability of measurement.

In the above embodiments and their various implementations, the reference to the tangential and radial components, and specifically the axial and tangential components of intake flow as defined by angles Φ and θ, have been illustrated with reference to a broadly linear shape of the intake region, for example where the intake region is represented by linear channels such as through-holes. It should be noted however that the confluence of the intake flow and the formation of the axial flow and resultant backflow of gas is defined by the tangential and radial component, and by the angle of the intake flow with respect to the plane of the aperture, as imparted on the intake flow as it enters the hollow body. In other words, it is the arrangement and shape of the intake region at or near the point of entry of the gas flow into the hollow body that determines the tangential and radial flow components.

With reference to FIG. 1, the above-described gas flow delivery structures may thus be particularly useful in an apparatus 1 for the manufacture of three-dimensional objects by layer-by-layer consolidation of particulate matter, comprising a build bed in which objects 2 are formed, and wherein, in use, an imaging or measurement device 70 is directed towards the build bed surface 12. The device 70 has a window 72 or an aperture mounted to the hollow body in correspondence to the upper aperture 84. Any of the above-described gas flow delivery structures may be mounted in correspondence with the window/aperture of the device 70, for delivering a flow of gas across the window/aperture of the device 70.

The window 72 may be a protective window, or it may be a sensitive component of the imaging or measuring device 70, for example the lens of a thermal camera. The window may thus broadly be an optic component of the imaging or measurement device. The device 70 may be a thermal camera for measuring the temperature profile from infrared radiation emitted from the build bed surface 12, and the upper aperture 84 may comprise a germanium window 72 of the device 70, that is sealingly mounted against the environment of the hollow body 82 within the upper aperture 84.

The shape of the hollow body, and in particular the degree of outwards flare, may be determined by the field of view required by the measurement or imaging device 70 in order to image or measure the entire build bed surface 12. Furthermore, as shown in FIG. 3A, a camera housing 74 may be mounted to the top of the gas supply chamber 200 and the housing may comprise a thermal camera 70 (or pyrometer, or similar) that is thus protected against the environment of the hollow body 82 by the germanium window 72. Such an arrangement further provides a separate enclosed environment for the device 70 which may be managed separately, for example it may be cooled by a separate flow of gas through the housing 74.

It is not essential that the hollow body comprises circular cross sections. Therefore, where reference is made to a "circumference" or a "radial direction", other shapes of the hollow body may equally apply and which may equally be described using synonyms of "perimeter" for "circumference", and "perpendicular to the longitudinal axis" for "radial direction".

In a method of delivering a (primary) flow of gas across the window/aperture of the imaging or measurement device of the apparatus 1, the method comprises the steps of:

supplying a primary flow of intake gas 100 through the gas flow intake region 86 of said structure 80, from opposing sides of the hollow body 82, and thence into the hollow body of said structure, wherein the primary flow of intake gas 100 has a primary flow component 102 that is predominantly parallel to the plane of the upper aperture of said structure, and coming into confluence within the hollow body; and redirecting the confluent flow of intake gas to form a predominantly axial flow of gas along the longitudinal axis of the hollow body, and a backflow of gas near the internal wall of the hollow body, wherein the upper aperture is substantially shielded from the backflow by the intake flow, and wherein the velocity of the backflow is relatively low in comparison to the velocity of the intake flow. The axial flow may be substantially concentric with the longitudinal axis, allowing for variation in symmetry.

The method may further comprise the primary flow component entering the hollow body at an acute angle to a perpendicular to the longitudinal axis, so as to create a primary circulating flow of gas into the hollow body.

Additionally, or instead, the method may further comprise supplying a secondary flow of intake gas through a secondary gas flow intake region from opposing sides of the hollow body, and thence into the hollow body of said structure, the secondary flow of intake gas having a secondary flow component that is predominantly parallel to the internal wall of the hollow body so as to create a secondary circulating flow of gas into the hollow body, the secondary intake region being located, with respect to the primary gas intake region, nearer the lower aperture of said structure.

Optionally, the secondary circulating flow may be of opposite rotational sense to that of the primary circulating flow.

The hollow body 82 may be made by (and may be particularly suitable to be manufactured by) a "print and sinter" method, for example by using a radiation absorbing ink and infrared radiation, or by a laser sinter method. Thus, all or some parts of the gas flow delivery structure 80 may be manufactured by a print and sinter method, and preferably by a sintering method using a radiation absorbing ink and infrared radiation.

It should be noted that the measurement or imaging device 70 may take different forms and is not limited to a thermal camera. Instead, the gas flow delivery structure 80 is suitable to protect a pyrometer or an optical camera, for example, or any other device requiring protection from the fumes and dust of the working space 4 but that needs to sense the interior of the working space in use.

While the examples illustrate an apparatus 1 comprising carriages that travel back and forth along the same direction, across the length of the build bed (along the x direction), this is not essential. Equally, the lamp assembly may be provided to a carriage travelling crosswise along the width of the build bed, or in any other manner suitable to irradiate the build bed surface.

The invention claimed is:

1. A structure for delivering a flow of gas across a window or aperture of an imaging or measurement device within an apparatus for the manufacture of three-dimensional objects by layer-by-layer consolidation of particulate matter, the structure comprising:

a hollow body having an upper aperture for mounting in correspondence with the window or aperture of said device, a lower aperture, a primary gas flow intake region and a secondary gas flow intake region, each arranged along at least part of a perimeter line of the hollow body and provided below the upper aperture and on opposing sides of the hollow body, when viewed in cross-section along a longitudinal axis that runs from the upper aperture to the lower aperture, wherein the primary gas flow intake region comprises one or more channels configured to allow, in use, a flow of intake gas to enter the hollow body from the opposing sides of the hollow body with a flow component that predominantly lies in a plane parallel to the plane of the upper aperture, and to come into confluence within the hollow body;

wherein the one or more channels are each configured as an elongate through-hole extending in a direction of elongation along the perimeter line of the hollow body and being bounded by two side walls, wherein one of the two side walls is arranged at an acute angle to the perpendicular to the longitudinal axis such that the flow component enters the hollow body at an acute angle to a perpendicular to the longitudinal axis to create a circulating flow of gas into the hollow body;

wherein the secondary gas flow intake region is provided on opposing sides of the hollow body when viewed in cross-section along the longitudinal axis, and comprises one or more secondary channels configured to allow, in use, a secondary flow of intake gas to enter the hollow body with a secondary flow component that is predominantly parallel to the internal wall of the hollow body, and wherein the secondary channels are arranged such that, in use, the secondary flow of gas flows in a rotational sense opposite to that of the primary flow of gas; and wherein the hollow body is symmetrically shaped about the longitudinal axis so as to redirect the confluent flow of intake gas to form a substantially axial flow of gas along the longitudinal axis and a backflow of gas near the internal wall of the hollow body, wherein the velocity of the backflow is relatively low in comparison to the velocity of the intake flow such that the upper aperture is substantially shielded from the backflow by the intake flow.

2. The structure of claim 1, wherein the elongate through-hole extends substantially perpendicular to the longitudinal axis of, and through the wall of, the hollow body.

3. The structure of claim 1, wherein the elongate through-hole includes side edges that are angled away from the perpendicular to the internal wall surface of the hollow body so that, in use, the flow component that predominantly lies in a plane parallel to the plane of the upper aperture is created.

4. The structure of claim 1, wherein the elongate through-hole is bounded by a lower edge and an upper edge connecting the two side walls, and one of the edges is angled away from the perpendicular to the internal wall surface of the hollow body so that, in use, the flow component that predominantly lies in a plane parallel to the plane of the upper aperture is created.

5. The structure of claim 1, wherein the elongate through-hole narrows in its cross-sectional area from the outer wall of the hollow body towards the internal wall of the hollow body.

6. The structure of claim 1, wherein, in use, the intake flow creates a continuous curtain of high velocity circulating gas parallel to and underneath the upper aperture, or angled down from the plane of the upper aperture, with respect to the velocity of the backflow of gas.

7. The structure of claim 1, wherein all of the channels are configured as elongate through-holes, and wherein the side walls between adjacent channels form a vane, each vane being arranged at an acute angle to the perpendicular to the longitudinal axis, such that the channels extend along the majority of the perimeter line of the hollow body and are separated by the vanes.

* * * * *